United States Patent [19]
Rudd, III

[11] Patent Number: 5,918,951
[45] Date of Patent: Jul. 6, 1999

[54] ANTISKID BRAKE CONTROL SYSTEM USING KALMAN FILTERING

[75] Inventor: Robert Edward Rudd, III, North Pownal, Vt.

[73] Assignee: The B.F. Goodrich Company, Richfield, Ohio

[21] Appl. No.: 08/853,555

[22] Filed: May 9, 1997

[51] Int. Cl.$^6$ ............................................. B60T 8/60
[52] U.S. Cl. ..................... 303/150; 188/181 T; 303/112; 303/163
[58] Field of Search ..................... 303/150, 126, 303/149, 148, 154, 160, 163, 164, 165, 169, 170, 171, 172, 176, 177, 199, 191, 183, 178, 112; 188/181 A, 181 C, 181 T; 701/71, 76, 75, 78, 79, 80, 90; 244/111

[56] References Cited

U.S. PATENT DOCUMENTS

| | | |
|---|---|---|
| 4,679,866 | 7/1987 | van Zanten et al. . |
| 4,715,662 | 12/1987 | van Zanten et al. . |
| 4,764,871 | 8/1988 | van Zanten . |
| 5,050,940 | 9/1991 | Bedford et al. . |
| 5,180,214 | 1/1993 | Yeh et al. . |
| 5,371,677 | 12/1994 | Ehret et al. ............................ 303/173 |
| 5,424,942 | 6/1995 | Dong et al. . |
| 5,454,630 | 10/1995 | Zhang . |

OTHER PUBLICATIONS

Hutchinson, et al., "Applications of Minimum Variance Reduce –State Estimators" IEEE Transactions on Aerospace and Electronic Systems; Sep. 1975; pp. 785–794.

du Plessis, "Poor Man's Explanation of Kalman Filtering" Autonetics Division, Rockwell International; date unknown.

Kobayashi, et al., "Estimation of Absolute Vehicle Speed using Fuzzy Logic Rule–Based Kalman Filter" Proceedings of the American Control Conference; Jun. 1995.

Mark L. Akey, "Fuzzy logic, anti–skid control for commercial trucks" Magnavox Decision support systems Applied Center of Excellence, Fort Wayne, Indiana SPIE vol. 2493, Mar. 1995, pp. 359–370.

*Primary Examiner*—Douglas C. Butler
*Attorney, Agent, or Firm*—Richard A. Romanchik; Mark D. Saralino

[57] ABSTRACT

A brake control system for controlling an amount of braking force applied to a wheel of a vehicle running on a surface, comprising a sensor for measuring a speed of the wheel and for providing an output signal indicative of the speed; and a controller, operatively coupled to the sensor, which implements a Kalman filter to estimate an amplitude and location of a peak in a mu-slip curve representative of a coefficient of friction between the wheel and the surface based on the output signal of the sensor, and which controls the amount of braking force applied to the wheel based on the amplitude and location of the peak.

55 Claims, 13 Drawing Sheets

Fig. 8A1
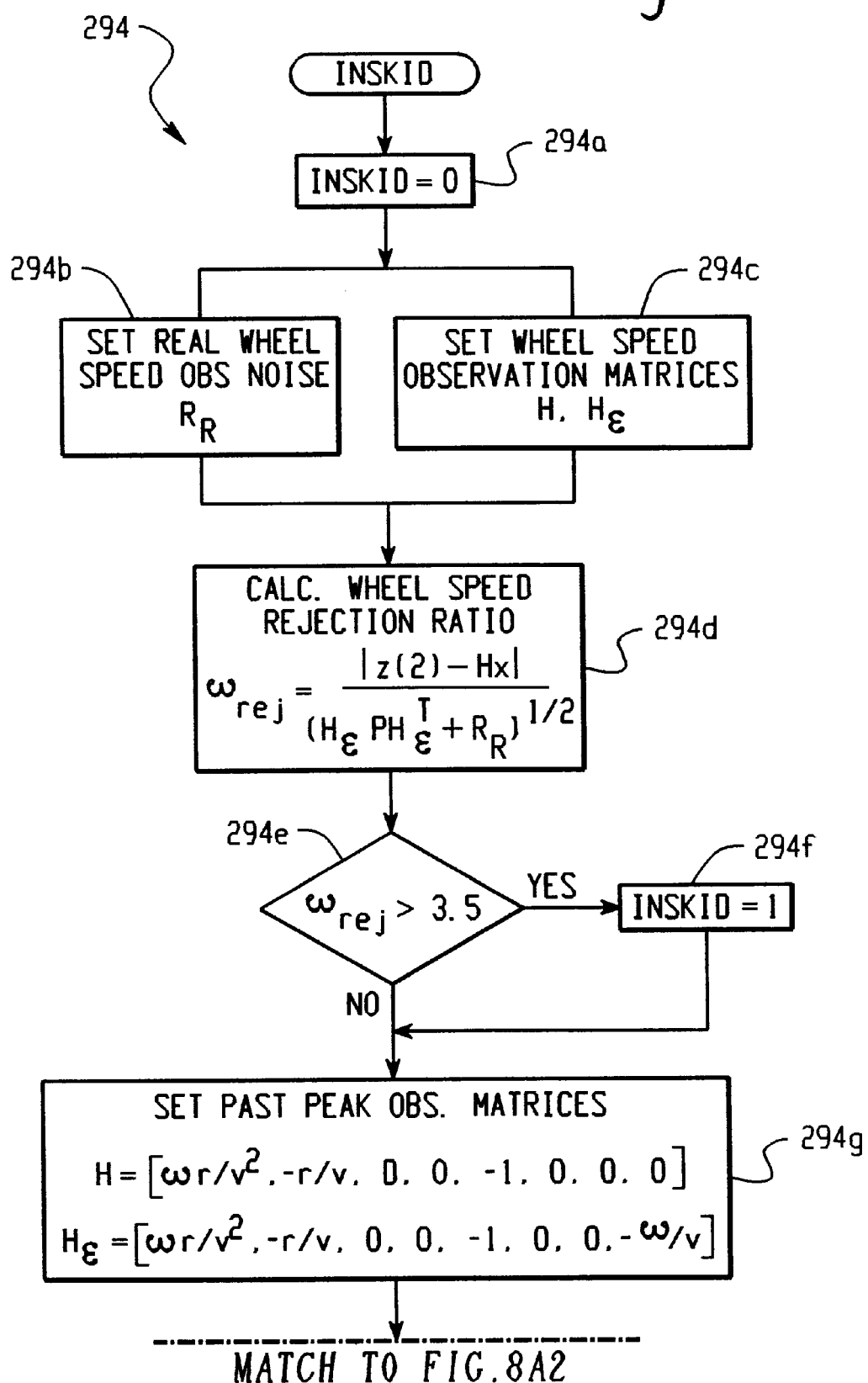

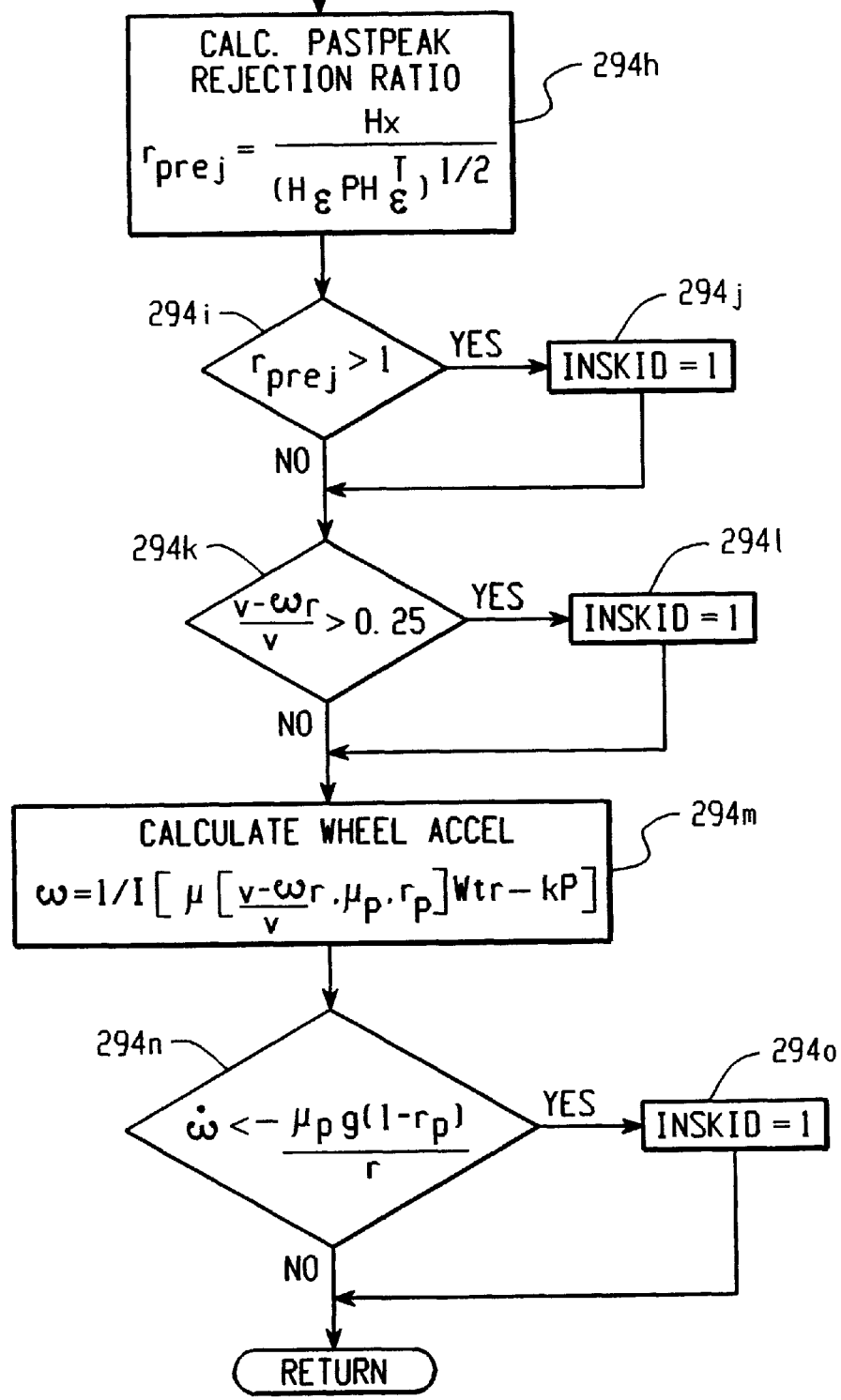
Fig. 8A2

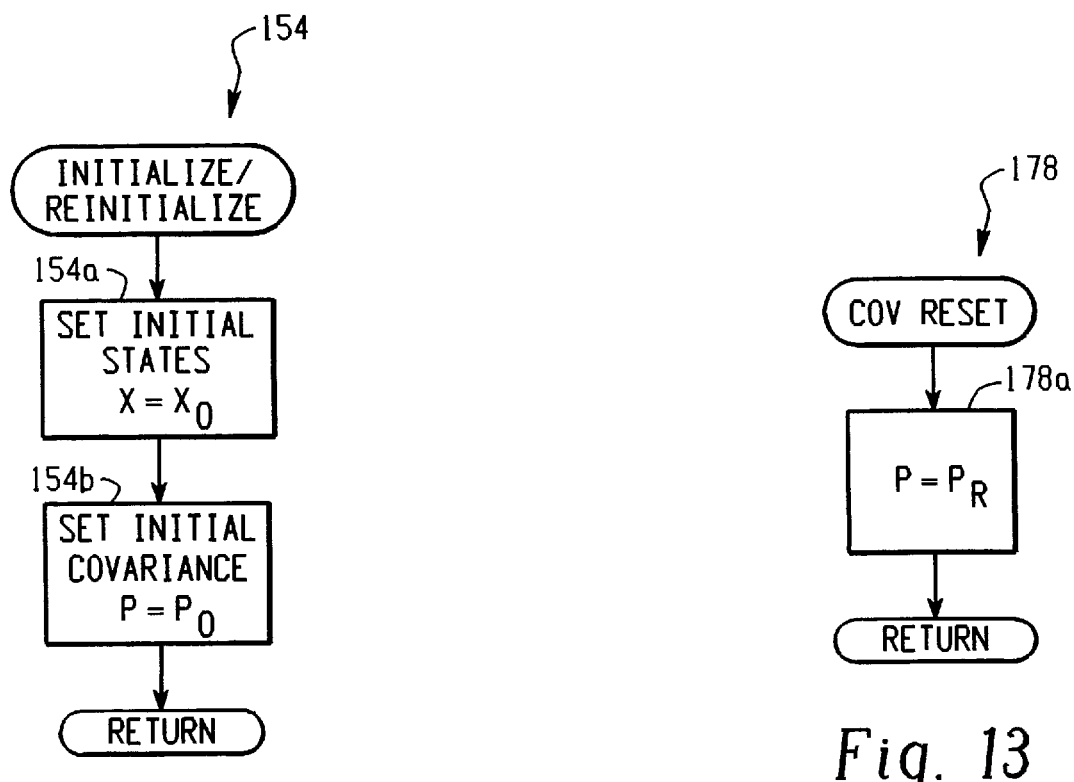
Fig. 12
Fig. 13
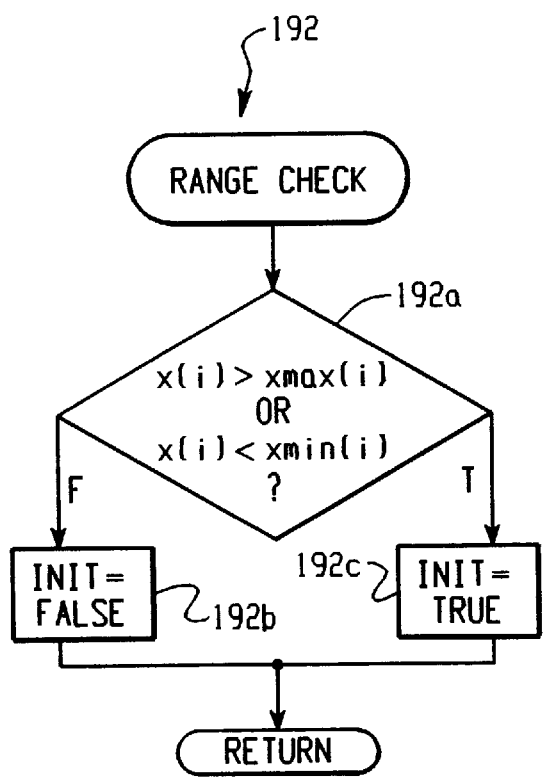
Fig. 14

ANTISKID BRAKE CONTROL SYSTEM USING KALMAN FILTERING

TECHNICAL FIELD

The present invention relates generally to brake control systems, and more particularly to antiskid brake control systems using Kalman filter techniques.

BACKGROUND OF THE INVENTION

Antiskid brake control systems have been in widespread use for many years. In the simplest sense, an antiskid brake control system compares the speed of a vehicle derived from a wheel speed sensor (and wheel radius) to the vehicle speed derived from a secondary or reference source. If the wheel is determined to be skidding an excessive amount, then brake pressure applied to the wheel is released and the wheel is allowed to spin back up to the appropriate speed.

There are, of course, two major problems that immediately become apparent in any such antiskid system. The first relates to determining the appropriate amount of skidding. The second relates to determining from where to obtain the reference velocity. The appropriate amount of skidding is described by the much discussed but seldom measured mu-slip curve. Typically such curve is represented by the coefficient of friction $\mu$ between the wheel and the running surface on a vertical axis and the slip ratio on the horizontal axis. A slip ratio of zero is when the wheel is not skidding while a slip ratio equal to one represents a fully locked wheel.

The amplitude and peak location of the mu-slip curve unfortunately can vary substantially for different running surfaces or even the same running surface. A lower amplitude mu-slip curve may represent an ice or water patch. Ideally, the antiskid brake control system should allow the wheel to slip at the peak of the mu-slip curve which provides the maximum stopping power. Antiskid brake control systems are commonly accepted to be ninety percent efficient which means that, on average, the control system should be within ten percent of the mu-slip peak regardless of the value or location of the peak. However, since the mu-slip curve depends on so many variables (e.g., and without being limited thereby, tire tread groove pattern, tire tread compound, temperature, tire pressure, running surface material and finish, etc.), the mu-slip curve begins to resemble a random variable. This makes it difficult for conventional antiskid brake control systems to track adequately the peak of the mu-slip curve.

Furthermore, it is not always easy to obtain a reference velocity of the vehicle. The braked wheel cannot be used freely because the wheel might be skidding. In the case of an aircraft brake control system, the nose wheel speed could be used for providing a reference velocity. Unfortunately, there could be instances where the nose wheel has not touched down yet or perhaps is worn or has low pressure so as to have a reduced radius. Alternatively, for example, the nose wheel may be locked due to a defective bearing. These instances will result in an erroneous reference velocity. A global positioning satellite (GPS) system or Doppler radar could provide a reference velocity but it may be inoperable or jammed. Alternatively, an inertial navigation system might provide a reference velocity. However, such systems can be prone to measurement error and/or relatively high cost.

Recently there have been efforts to utilize optimal state estimation techniques, such as Kalman filters, in antiskid brake control systems. For example, U.S. Pat. No. 4,679,866 to van Zanten et al. discusses a method for ascertaining a set-point braking moment using a Kalman filter. U.S. Pat. No. 4,715,662 to van Zanten et al. describes a method for determining an optimal slip value using a Kalman filter. While such systems attempt to take advantage of state estimation techniques in determining the optimal slip value, etc., there still remain difficulties as far as observability, speed of convergence, process and measurement noise, etc. Matters such as these can greatly affect the ability of such a system to actually operate in practice.

In view of the aforementioned shortcomings associated with conventional antiskid brake control systems, there is a strong need in the art for a system capable of accurately and reliably ascertaining the relevant parameters such as the appropriate amount of skidding and reference velocity. Moreover, there is a strong need in the art for a system which can ascertain such information more rapidly and accurately as compared to conventional systems.

SUMMARY OF THE INVENTION

In accordance with one aspect of the invention, a brake control system is provided for controlling an amount of braking force applied to a wheel of a vehicle running on a surface. The brake control system includes a sensor for measuring a speed of the wheel and for providing an output signal indicative of the speed; and a controller, operatively coupled to the sensor, which implements a Kalman filter to estimate an amplitude and location of a peak in a mu-slip curve representative of a coefficient of friction between the wheel and the surface based on the output signal of the sensor, and which controls the amount of braking force applied to the wheel based on the amplitude and location of the peak.

According to another aspect of the invention, a brake control system is provided which includes a sensor for measuring a speed of the wheel; and a controller, operatively coupled to the sensor, which implements a state estimator to estimate an amplitude and location of a peak in a mu-slip curve representative of a coefficient of friction between the wheel and the surface based on an output of the sensor, and which controls the amount of braking force applied to the wheel based on the amplitude and location of the peak.

In accordance with still another aspect of the invention, a brake control system is provided which includes a sensor for measuring a speed of the wheel; and a controller, operatively coupled to the sensor, for estimating a location of a peak in a mu-slip curve representative of a coefficient of friction between the wheel and the surface based on an output of the sensor, and for controlling the amount of braking force applied to the wheel so as to maintain a slip ratio with respect to the velocity of the wheel compared to a velocity of the vehicle at or near the location of the peak in the mu-slip curve without tending to exceed the location of the peak.

According to another aspect of the invention, a brake control system is provided which includes a sensor for measuring a speed of the wheel and for providing an output signal indicative of the speed; and a controller, operatively coupled to the sensor, which implements a Kalman filter to estimate at least one parameter of a mu-slip curve representative of a coefficient of friction between the wheel and the surface based on the output signal of the sensor, and controls the amount of braking force applied to the wheel based on the estimated parameter, wherein the controller is configured to reset a covariance associated with the at least one parameter in the Kalman filter upon detection of a skid condition between the wheel and the surface.

In accordance with still another aspect of the invention, a brake control system is provided which includes a sensor for measuring a speed of the wheel and for providing an output signal indicative of the speed; and a controller, operatively coupled to the sensor, which implements a Kalman filter to estimate at least one parameter of a mu-slip curve representative of a coefficient of friction between the wheel and the surface based on the output signal of the sensor, and controls the amount of braking force applied to the wheel based on the estimated parameter, wherein the controller is configured to employ an adjustable amount of control gain in controlling the amount of braking based on the estimated parameter.

According to another aspect of the invention, a brake control system is provided which includes a sensor for measuring a speed of the wheel; and a controller, operatively coupled to the sensor, which implements a state estimator to estimate at least one parameter of a mu-slip curve representative of a coefficient of friction between the wheel and the surface based on an output of the sensor, and which controls the amount of braking force applied to the wheel based on the at least one parameter, wherein the amount of braking force is determined at least in part by a predefined mathematical function comprising a periodic component for increasing an ability of the state estimator to observe the at least one parameter.

In accordance with still another aspect of the invention, a method for controlling an amount of braking force applied to a wheel of a vehicle running on a surface, comprising: measuring a speed of the wheel and for providing an output signal indicative of the speed; and using Kalman filter techniques to estimate an amplitude and location of a peak in a mu-slip curve representative of a coefficient of friction between the wheel and the surface based on the output signal of the sensor, and controlling the amount of braking force applied to the wheel based on the amplitude and location of the peak.

According to another aspect of the invention, a brake control system is provided for controlling an amount of braking force applied to a wheel of a vehicle running on a surface, which includes a sensor for measuring a speed of the wheel; and a controller, operatively coupled to the sensor, which implements a state estimator to estimate at least one parameter of a mu-slip curve representative of a coefficient of friction between the wheel and the surface based on an output of the sensor, and which controls the amount of braking force applied to the wheel based on the at least one parameter, wherein the state estimator initializes the at least one parameter by setting the at least one parameter to an initial value which is predetermined to be greater than an expected true value of the at least one parameter.

In accordance with still another aspect of the invention, a brake control system is provided for controlling an amount of braking force applied to a wheel of a vehicle running on a surface, which includes a sensor for measuring a speed of the wheel; and a controller, operatively coupled to the sensor, for estimating a location of a peak in a mu-slip curve representative of a coefficient of friction between the wheel and the surface based on an output of the sensor, and for controlling the amount of braking force applied to the wheel based on an operating point biased towards maintaining a slip ratio with respect to the velocity of the wheel compared to a velocity of the vehicle, below the location of the peak in the mu-slip curve.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 8A1 and 8A2 illustrate a flowchart representing a routine for detecting if the brake is currently in a skid condition in accordance with the present invention;

FIG. 12 is a flowchart illustrating a routing for initializing/reinitializing the system in accordance with the present invention;

FIG. 13 is a flowchart defining the manner in which the covariance matrix is reset in the event a skid condition occurs in accordance with the present invention; and FIG. 14 is a flowchart describing a routine for range checking the system parameters in accordance with the present invention.

DESCRIPTION OF THE PREFERRED EMBODIMENT

The present invention will now be described with reference to the drawings, wherein like reference labels are used to refer to like elements throughout.

Figure 1:
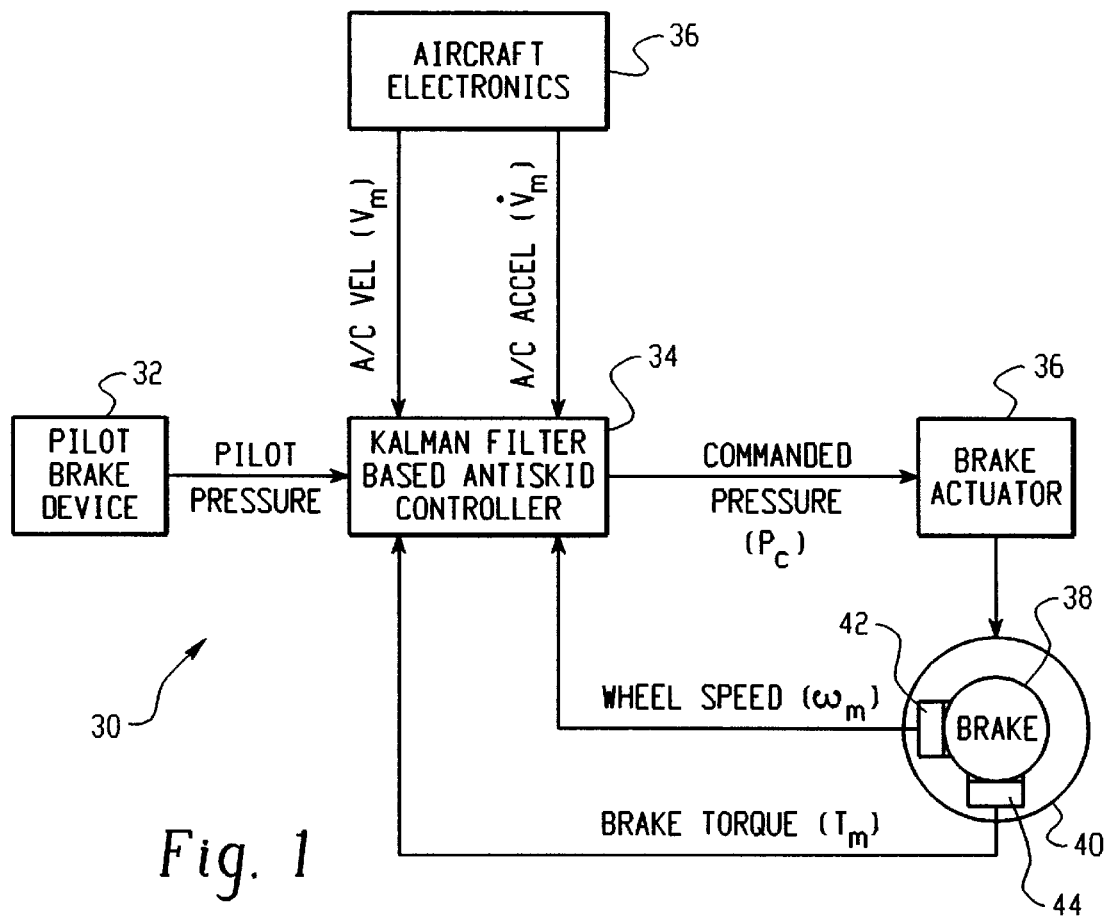
FIG. 1 is a block diagram of an aircraft antiskid brake control system using Kalman filtering in accordance with a preferred embodiment of the present invention.

Referring initially to FIG. 1, an antiskid brake control system for an aircraft in accordance with the present invention is generally designated 30. Brake control on an aircraft is usually structured in a paired wheel configuration for functional modularity. For example, if the aircraft has two wheels on the left side of the aircraft and two wheels on the right side, the outer two wheels form a pair and the inner two wheels form another pair. Within a pair there is a right wheel control and left wheel control. The left and right wheel control functions are uncoupled except for locked wheel protection. Locked wheel protection (which compares left and right wheel speed and releases pressure when the wheel speeds differ by 30%) is considered a different function than antiskid control. The basic unit therefore consists of control of a single wheel which can be left or right. As utilized herein, it will be appreciated that the term "wheel" is intended to refer collectively to both the wheel and tire.

For sake of simplicity, the brake control system 30 as shown in FIG. 1 represents the basic unit for providing antiskid control of a single wheel (left or right). However, it will be appreciated that control for the other wheel(s) can be provided via corresponding systems 30 or in a single system incorporating the same inventive principles. Moreover, the preferred embodiment of the present invention provides antiskid brake control in connection with an aircraft. Nevertheless, it will be appreciated that the brake control system of the present invention has utility for virtually any type of vehicle and is not limited necessarily to brake control for aircraft.

The system 30 includes a pilot brake device 32 for providing operator brake control. In addition, the system 30 includes a Kalman filter based antiskid controller 34. The controller 34 employs state estimation techniques as is described more fully below in order to provide optimum brake control during antiskid conditions. The system 30 further includes the aircraft electronics 36 for providing measurement data such as aircraft velocity and acceleration to the controller 34. The controller 34 provides a control signal to a brake actuator 36 also included in the system 30. The brake actuator 36 may be any conventional type actuator (e.g., hydraulic or electromechanical) for applying pressure to the brake friction material (not shown) in a brake assembly 38. The brake assembly 38 in turn provides braking action to a wheel 40 as is conventional.

The system 30 preferably includes a velocity sensor 42 and brake torque sensor 44. The velocity sensor 42 senses the angular velocity of the wheel 40. The brake torque sensor 44 measures the amount of torque exerted by the wheel 40 on the brake assembly 38. The measured velocity and torque are input to the controller 34. As will be discussed in detail below, the controller 34 processes the wheel velocity (speed), brake torque, aircraft velocity and acceleration using a Kalman filter in order to provide appropriate brake pressure to the brake assembly 38 to provide optimum braking.

Generally describing the operation of the control system 30, the pilot brake device 32 comprises a pedal or an equivalent thereof. During braking, the pilot of the aircraft activates the pilot brake device 32 by pushing the pedal (or its equivalent). The depression of the pedal is converted to an electrical signal (PILOT PRESSURE) which is provided to the controller 34. The PILOT PRESSURE signal is indicative of the degree of depression of the pedal, and is related to the amount of brake pressure requested by the pilot as is conventional.

The controller 34 receives the request for brake pressure via the PILOT PRESSURE signal and compares it to a maximum brake pressure that the Kalman filter within the controller 34 estimates can be applied without incurring an undesirable skid condition. The lower of the pilot requested pressure and the estimated maximum pressure is then passed to a rate limiter within the controller 34. Thereafter, the resultant pressure request is passed on to the actuator 36 in the form of a command pressure ($P_c$) signal. The value of the $P_c$ signal is indicative of the amount of brake pressure to be applied by the actuator 36. The actuator 36, using conventional techniques, then applies pressure to the brake friction material in the brake assembly 38 based on the value of the $P_c$ signal. As a result, braking action occurs in the form of a reduction of wheel speed and an increase in brake torque and wheel slippage.

As will be described more fully below, the Kalman filter-based antiskid controller 34 receives, at a minimum, the measured wheel speed ($\omega_m$) as an input from the velocity sensor 42. However, in the preferred embodiment the controller 34 also takes in the measured brake torque ($T_m$) from the sensor 44 together with the measured aircraft velocity ($V_m$) and acceleration ($\dot{V}_m$) provided by the aircraft electronics 36. The aircraft velocity $V_m$ and acceleration $\dot{V}_m$ may be provided by a conventional velocity sensor and accelerometer, respectively, included in the aircraft electronics 36. From such measured data, the Kalman filter within the controller 34 estimates the peak of the mu-slip curve as is discussed in detail below. The mu-slip curve represents the relationship between the coefficient of friction ($\mu$) between the wheel 40 and the runway surface and the amount of slip between the wheel 40 and runway surface. The controller 34 then utilizes the estimated peak of the mu-slip curve to calculate the peak pressure that can be applied by the brake 38 without undesirable skidding.

The Kalman filter algorithm carried out within the controller 34 differs from conventional antiskid control algorithms by minimizing the excursions past the peak of the mu-slip curve which can result in excess tire wear on the wheel 40, and in extreme cases, flat spotting and flats. Conventional antiskid algorithms find the peak of the mu-slip curve by going past the peak and identifying a skid by high wheel deceleration (or other means). The Kalman filter algorithm as implemented in the present invention has many less excursions past the peak because it continuously estimates the location of the peak as discussed below.

Generally speaking, Kalman filters are typically used where there are unknown or poorly known parameters or models. In the context of antiskid control, the primary unknown parameter is the peak of the mu-slip curve with respect to both amplitude and location. As is described below, the amplitude and location of the peak are modeled as "constants" in the Kalman filter although two techniques are utilized to track changes in these parameters. Slowly varying changes are accounted for by adding fictitious noise to the friction parameters. Step-like changes in the parameters are handled by resetting the covariances within the filter.

Use of the Kalman filter based controller 34 has other advantages in that measurements other than the conventional wheel speed can be incorporated by allowing for the appropriate observation matrix to be set as discussed below. An additional advantage is that since a model of the aircraft, wheel and brake is built into the Kalman filter algorithm, the algorithm is easily adapted to other aircraft simply by incorporating the specific aircraft constants (e.g., wheel and brake inertia).

Figure 2A:
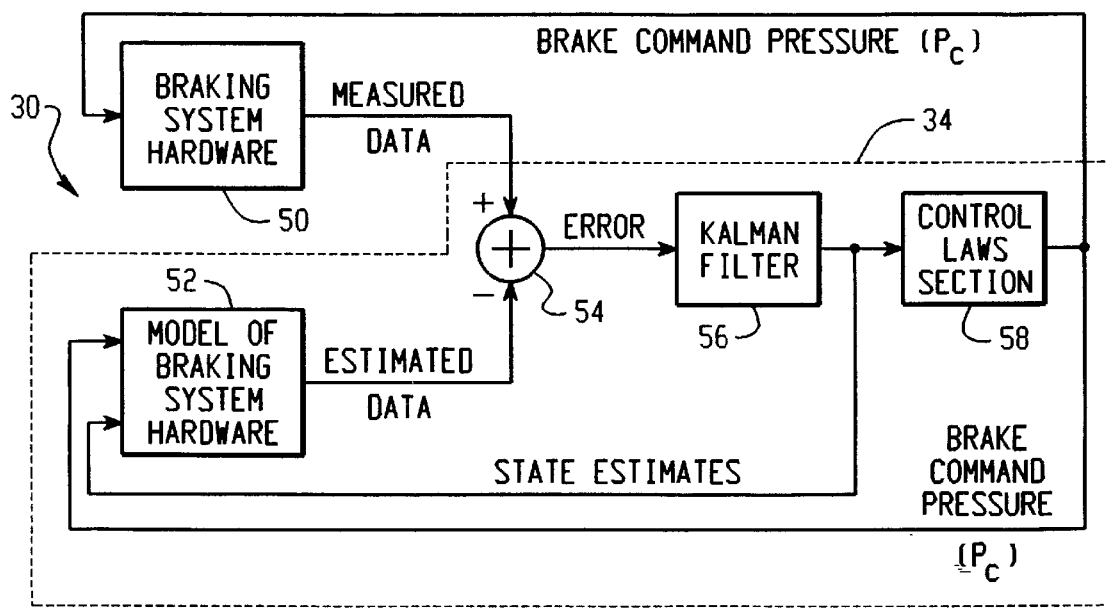
FIG. 2A is a schematic representation of the brake control system of FIG. 1 in accordance with the present invention.

FIG. 2A presents a schematic illustration of the system 30 with emphasis on the controller 34. Block 50 represents the "real" system hardware including, for example, the wheel 40, brake assembly 38, actuator 36, friction between the brake assembly friction material and the wheel 40, the aircraft electronics 36, pilot brake device 32, velocity sensor 42, brake torque sensor 44, as well as any other physical parameters (including the aircraft itself which may be considered when employing the Kalman filter algorithm. Block 50 provides as an output signals representing measured data including, for example, aircraft velocity $V_m$ and acceleration $\dot{V}_m$, PILOT PRESSURE, wheel speed $\omega_m$, and brake torque $T_m$. Such measured data is input to the controller 34.

Block 52 within the controller 34 represents a mathematical model of the braking system hardware. Those having ordinary skill in the art of digital filtering will appreciate that the system hardware can be modeled as a set of equations including a set of state equations. These equations are utilized within the controller 34 to provide estimated data relating to the various parameters within the system 30 including, for example, the estimated aircraft velocity, acceleration, wheel speed, etc. The controller 34 compares the measured data to the estimated data via an adder 54. The difference between the measured data and the estimated data represents a system error which is provided to the Kalman filter 56. In turn, the Kalman filter 56 computes Kalman gains and outputs updated state estimates. The state estimates are provided to a control laws section 58 which computes a brake pressure set point from the state estimates and outputs a brake command pressure ($P_c$). The brake command pressure $P_c$ is provided to the actuator 36 included in block 50 for providing the desired amount of braking. In addition, the brake command pressure $P_c$ together with the state estimates from the Kalman filter 56 are fed back to the system model block 52 in order to update the state equations.

Figure 2B:
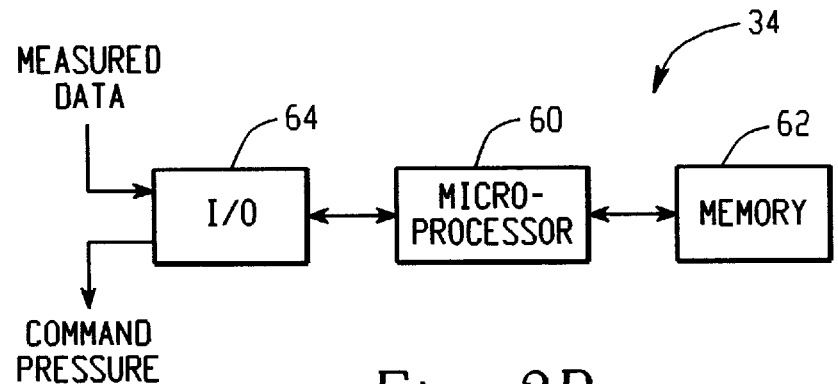
FIG. 2B is a block diagram of the Kalman filter based antiskid controller used in the brake control system in accordance with the present invention.

FIG. 2B is a block diagram illustrating an actual embodiment of the controller 34 in accordance with the present invention. The controller 34 includes a microprocessor 60 responsible for performing the various control and computational functions described herein. The microprocessor 60 is coupled to a memory 62 including, for example, both volatile and non-volatile sections. The memory 62 has operating code stored therein which is executed by the microprocessor 60 in carrying out the various functions described herein. It will be appreciated that those having ordinary skill in the art of programming and digital filtering will be able to program such a microprocessor 60 to perform the various functions described herein without undue effort or experimentation. Such programming can be implemented using any of a number of conventional programming languages and will be readily apparent particularly in view of the various flowcharts described below. Accordingly, specific detail regarding the operating code itself is omitted for sake of brevity.

The memory 62 also has stored therein the various system equations, initialization and reset parameters, etc., referred to herein for purposes of carrying out the antiskid control. Moreover, the microprocessor 60 is coupled to an input/output (I/O) interface 64 which allows the microprocessor 60 to receive the time variant measured data (e.g., $V_m$, $\dot{V}_m$, PILOT PRESSURE, $\omega_m$, and $T_m$). In addition, the interface 64 serves to couple the command pressure signal $P_c$ from the microprocessor 60 to the brake actuator 36.

SYSTEM STATE EQUATIONS

In the preferred embodiment, the antiskid brake control system 30 uses the following set of equations to model the system:

aircraft (A/C) velocity $\dot{V} = -\mu[(V-\omega r)N, \mu_p, r_p]g + n + n_f$ (1)

wheel speed $\dot{\omega} =$ (2)
$(1/I)[\mu[(V-\omega r)N, \mu_p, r_p]W_t r - \text{sign}[\omega]kP] + n + n_f$ brake pressure $\dot{P} = (1/\tau)[P_c - P] + n + n_f$ (3)

friction peak amplitude $\dot{\mu}_p = n + n_f$ (4)

friction peak location $\dot{r}_p = n + n_f$ (5)

torque to pressure ratio $\dot{k} = n + n_f$ (6)

weight per wheel ratio $\dot{W}_t = n + n_f$ (7)

wheel radius $\dot{r} = n + n_f$ (8)

where:

the superscript "˙" indicates the time derivative of the respective parameters as is conventional;

$\mu$ is a mathematical function describing the coefficient of friction of between the wheel (tire) and runway surface;

g refers to acceleration of gravity;

I refers to the inertia of the wheel and brake assembly sign refers to the sign operation;

$\tau$ represents a time delay associated with the response time of the brake actuator;

$P_c$ represents the command pressure;

n represents the actual noise for the respective parameters; and $n_f$ represents the fictitious noise for the respective parameters.

Equations (1) and (2) for the aircraft velocity V and wheel speed $\omega$ are derived by applying force and torque sums (represented by square brackets) to the aircraft and the wheel 40 and brake assembly 38, respectively. The specific application of force and torque sums as they relate to aircraft velocity and wheel speed will depend on the particular aircraft, wheel type, etc., as will be appreciated. Those having ordinary skill in the art of digital filtering techniques and aircraft braking systems will be able to determine specific state equations for a given application based on the disclosure herein.

The brake pressure equation (3) is a simple first order lag which accounts for the finite time it takes the actuator 36 to respond to a command. As is described in more detail below, equations (1)–(3) are solved in accordance with the present invention to find the peak pressure that can be applied to the brake 38 while remaining at the top of the mu-slip curve. Generally speaking, the brake pressure required to operate at the peak of the mu-slip curve may be calculated from the torque sum on the wheel 40:

$$I \dot{\omega}_p = \mu_p W_t r - k P_p \qquad (9)$$

where $P_p$ represents the peak pressure that can be applied to the brake 38.

The deceleration of the wheel 40 when operating at the peak of the mu-slip curve may be calculated from the force sum on the aircraft as follows:

$$\dot{V}_p = -\mu_p g \tag{10}$$

$$\dot{\omega}_p = (1 - r_p)\dot{V}_p/r \tag{11}$$

$$= -\mu_p g(1 - r_p)/r \tag{12}$$

where $r_p$ represents the friction peak location.

Equations (9) through (12) may then be solved for the peak pressure $P_p$, giving:

$$P_p = (\mu_p/k)[W_t r + g I(1-r_p)/r] \tag{13}$$

Inspection of this equation identifies the variables utilized within the system 30 to calculate the peak pressure and hence the state vector. The state vector is represented as follows:

$$X^T = \{V, \omega, P, \mu_p, r_p, k, W_t, r\} \tag{14}$$

where the superscript T represents the transpose as is conventional.

It will be noted that the inertia I of the wheel and brake assembly is not included in the state vector. In the preferred embodiment, the inertia I is not included as it would take up computer resources unnecessarily. The equation for torque sum on the wheel 40 can be divided by inertia resulting in the terms of $W_t/I$ and k/I. These terms could be defined as state vector elements but since inertia is not expected to change much in an aircraft, the state elements are chosen as $W_t$ and k. If inertia is high, the $W_t$ and k term will estimate low, etc. It will be appreciated that Eq. 13 for the peak pressure could be modified to include secondary terms such as rolling resistance and/or other parasitic terms.

Since the peak location of the mu-slip curve is least observable when operating at the peak $\mu_p$ as discussed more fully below, the initial conditions for the friction states, $\mu_p$ and $r_p$, are preferably biased to the high side of the mu-slip curve. The Kalman filter has been found to estimate better (e.g., more quickly) when the true value of the friction parameters were less than the estimated values

SYSTEM MEASUREMENT VECTOR

As mentioned briefly above, the possible measurements within the system 30 as represented in FIG. 1 include:

$V_m$ aircraft velocity (ft/sec)

$\omega_m$ wheel speed (rad/sec)

$T_m$ brake torque (ft.lb)

$\dot{V}_m$ aircraft acceleration (ft/sec$^2$)

The measurement vector, z, is represented as follows:

$$z^T = \{V_m, \omega_m, T_m, \dot{V}_m\}^T \tag{15a}$$

where the superscript T represents the transpose as is conventional.

Figure 3:
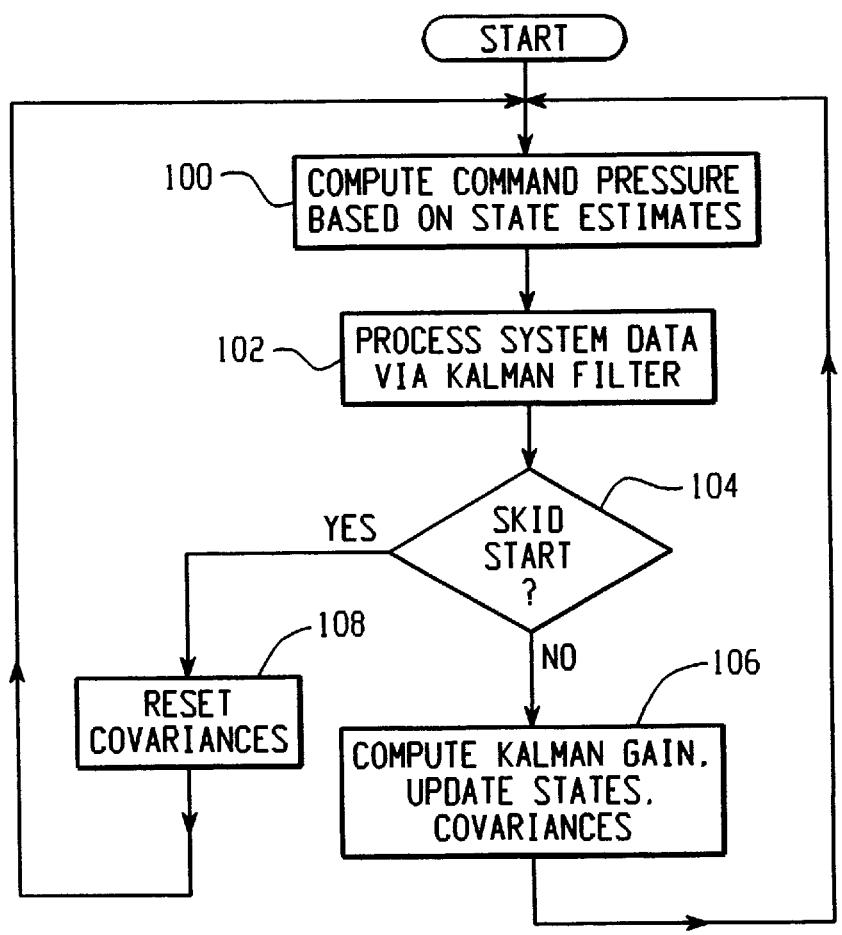
FIG. 3 is a simplified flowchart representing the operation of the brake control system in accordance with the present invention.

Referring now to FIG. 3, a flowchart is provided summarizing the general operation of the brake control system 30 in accordance with the invention. Beginning in step 100, the controller 34 computes the appropriate command pressure $P_c$ to provide to the actuator 36 for providing the desired amount of braking action. The manner in which the command pressure $P_c$ is computed is described in more detail below in relation to FIG. 6. Next, in step 102 the controller 34 analyzes and processes the various data within the system 30 via the Kalman filter. (See FIGS. 5A, 5B discussed below.) Based on such information, the controller 34 in step 104 determines whether a skid condition has started as a result of the braking action. (See FIGS. 7, 8A1, 8A2, 8B discussed below). Provided a skid is not occurring or had previously begun, the controller 34 proceeds to step 106 in which the Kalman gain for the filter is computed and the covariances updated in order to maintain operation at or near the peak of the estimated mu-slip curve. (See FIGS. 5A, 5B). Thereafter, the controller 34 returns to step 100 to recompute the command pressure based on the updated information.

If a skid is determined to have begun in step 104, the controller 34 proceeds instead to step 108. In step 108, the controller 34 resets the covariances of the Kalman filter in order that it may attempt to reconverge on the peak of the estimated mu-slip curve so as to provide optimum braking without skidding. (See, FIGS. 5A, 5B, 10B). Following step 108 the controller 34 returns to step 100 in which it recalculates the command pressure provided to the actuator 36 based on the new covariances.

Figure 4:
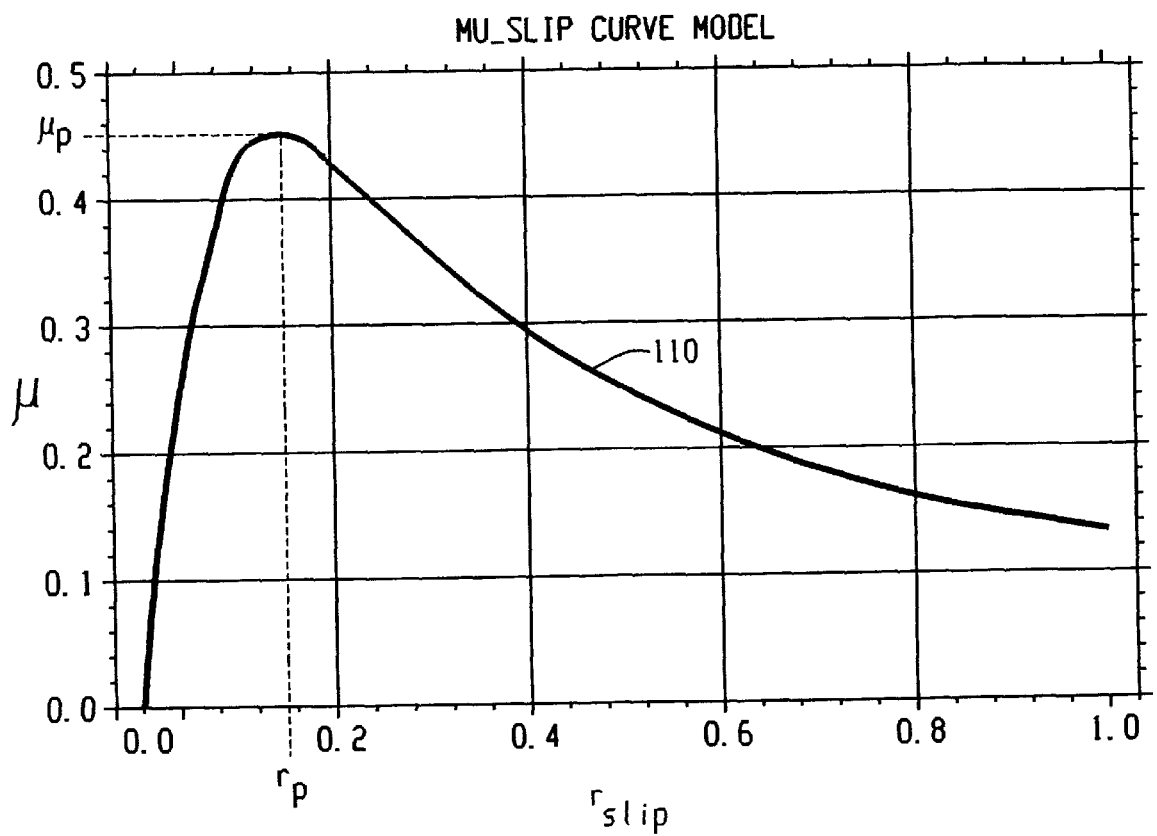
FIG. 4 is an exemplary mu-slip curve illustrating the relationship between the coefficient of friction ($\mu$) and the slip ratio ($r_{slip}$) between an aircraft wheel and a runway surface in accordance with the present invention.

Referring briefly to FIG. 4, a mu-slip curve 110 as modeled in accordance with the preferred embodiment of the present invention is shown. In FIG. 4, the ordinate represents the coefficient of friction $\mu$ between the wheel 40 and the runway surface. The abscissa represents the slip ratio $r_{slip}$ between the wheel 40 and the runway surface and is given by:

$$r_{slip} = (V - \omega r)/V \tag{15b}$$

The peak of the mu-slip curve 110 is designated by the friction peak amplitude $\mu_p$ and is located at the friction peak slip ratio $r_p$ (also referred to herein as the friction peak location or peak slip ratio $r_p$) as shown.

The mathematical function describing the relationship is:

$$\mu[r_{slip}, \mu_p, r_p] = (\mu_p \beta)(r_{slip}/r_p)/\{(\beta - 1) + |r_{slip}/r_p|^\beta\} \tag{15c}$$

where $\beta$ is a parameter which controls the steepness of the mu-slip curve. A value of two has been found to match test data well. This quantity may be scaled up or down to match specific data. The Kalman filter within the controller 34 uses this model of the mu-slip curve in estimating the appropriate braking commands as discussed in greater detail below.

Figure 5A:
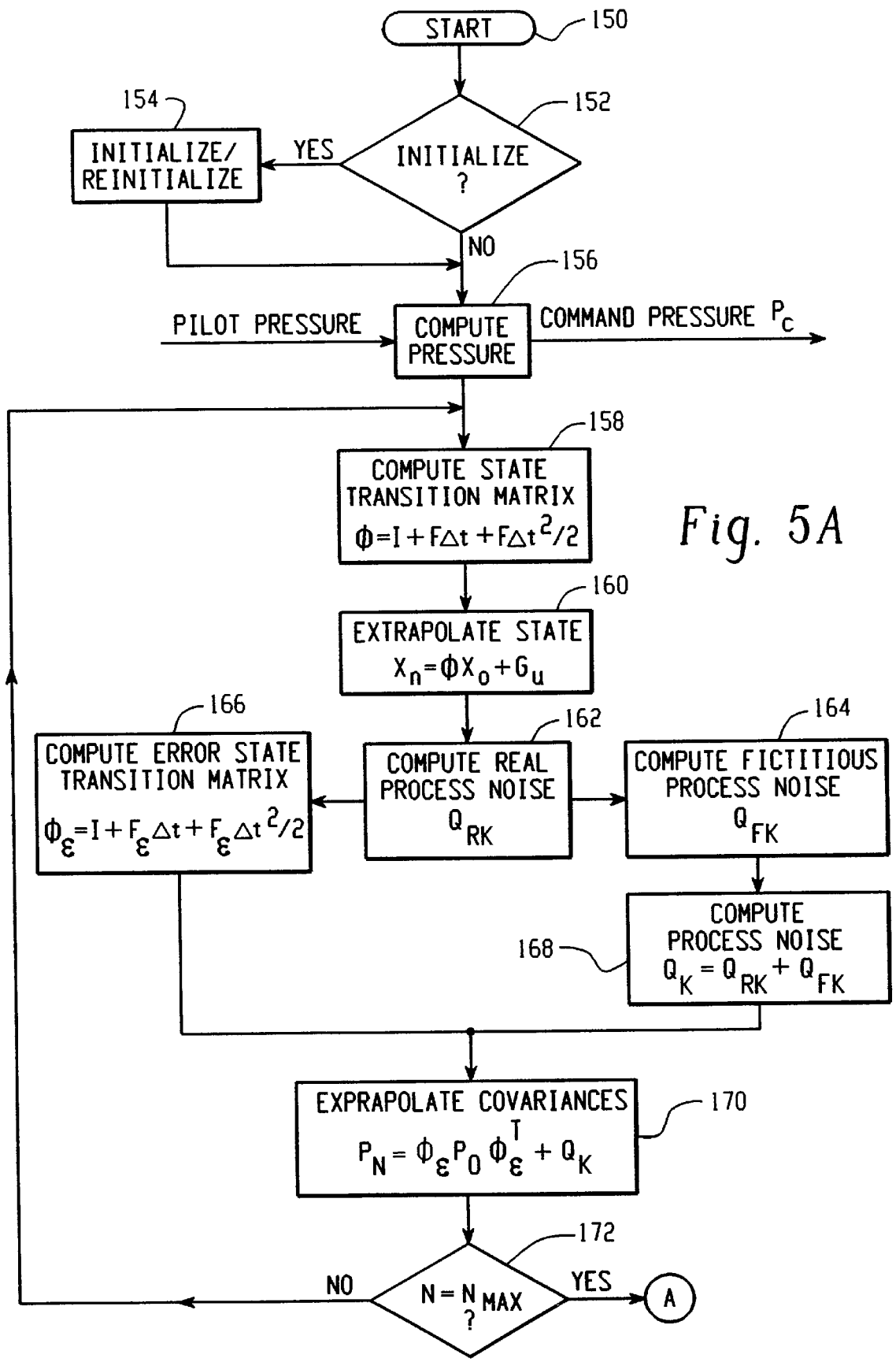
FIGS. 5A and 5B show a detailed flowchart describing more specifically the operation of the brake control system in accordance with the present invention.
Figure 5B:
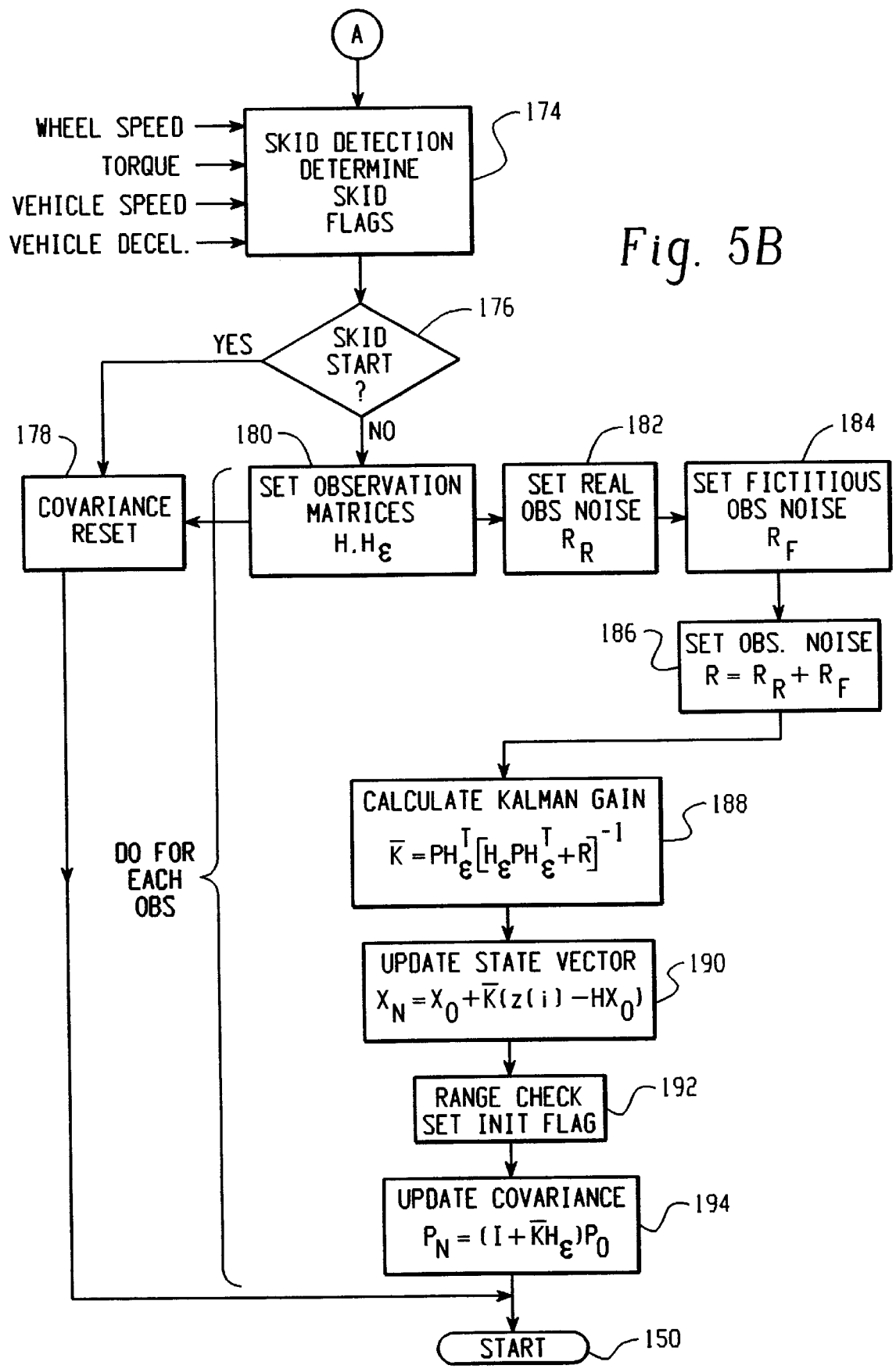

Turning to FIGS. 5A and 5B, operation of the Kalman filter based brake control system 30 will now be described in more detail. Operation begins with step 150 upon the system 30 being powered up initially, etc. Following step 150, the controller 34 proceeds to step 152 in which the controller 34 determines if it is necessary to initialize/reinitialize itself. Specifically, the controller 34 determines if an initialization flag INIT has been set as discussed below. Generally speaking, the INIT flag is set upon the system 30 initially being powered up or upon one or more of the state vector elements falling outside a predefined range. In the event the INIT flag has been set as determined in step 152, the controller 34 proceeds to step 154 in which it initializes/reinitializes itself.

The procedure for initializing/reinitializing the controller 34 is described in detail below in relation to FIG. 12. Briefly, such procedure involves first measuring the current wheel speed $\omega_m$ as provided to the controller 34 from the velocity sensor 42. The state vector X (Equ. 14) is then initialized by setting the estimated wheel velocity $\omega$ equal to the measured wheel velocity $\omega_m$. In addition, the initial values of the remaining state vector elements are set as described in more detail below. Also in step 154 the state covariance matrix P for the Kalman filter is initialized to predefined initial values $P_o$ selected for carrying out the invention. Following step 154 (or step 152 in the event the INIT flag is not set as determined in step 152), the controller 34 proceeds to step 156.

In step 156, the controller 34 computes the command pressure $P_c$ which is to be applied to the brake 38 via the actuator 36. The command pressure $P_c$ is computed based on the PILOT PRESSURE signal received by the controller 34, and the command pressure $P_c$ is output to the actuator 36. The procedure for computing the command pressure $P_c$ based on the estimates provided by the Kalman filter within the controller 34 is discussed below in detail in connection with FIG. 6. The controller 34 then provides the calculated command pressure $P_c$ to the actuator 36 as represented by step 156.

Following step 156, the controller 34 proceeds to step 158 in which the state transition matrix $\phi$ for the Kalman filter is computed as follows:

$$\phi = I + F\Delta t + F\Delta t^2/2 \tag{15d}$$

where I is the identity matrix, $\Delta t$ represents the time increment of the data being processed by the Kalman filter, and F represents the state vector dynamics matrix which is constructed from the state equations 1–8.

The controller 34 then proceeds from step 158 to step 160 in which the controller 34 extrapolates the state vector information $X_n$ for discrete time point n based on the following difference equation:

$$X_n = \phi X_o + Gu \tag{16}$$

where $X_n$ represents the new or current state vector X at time point n, $X_o$ represents the state vector from the old or last processing cycle, u represents the control input, and G represents a matrix arising in the formulation. The process for converting the state equations (1–8) to matrix form (equations 15d and 16) can be found in Gelb et al., Applied Optimal Estimation, TASC (1974).

Next, in step 162 the controller 34 computes the real process noise $Q_{RK}$ matrix associated with the system state equations 1–8 set forth above. The real process noise matrix $Q_{RK}$ is represented as follows:

$$Q_{RK} = \tag{17a}$$

$$\text{off diagonals } Q_{RK}(i, j) = 0 \quad \text{for } i \neq j$$

$$Q_{RK}(i, j) = (\text{real process noise})^2 \quad \text{for } i = j$$

Exemplary values for the real process noise matrix $Q_{RK}$ are discussed below.

Following step 162, the controller 34 proceeds to steps 164 and 166. Specifically, in step 164 the controller 34 computes the fictitious process noise matrix $Q_{FK}$ as is described more fully below. Generally, the fictitious process noise matrix $Q_{FK}$ can be represented as follows:

$$Q_{RK} = \tag{17b}$$

$$\text{off diagonals } Q_{FK}(i, j) = 0 \quad \text{for } i \neq j$$

$$Q_{FK}(i, j) = (\text{fictitious process noise})^2 \text{ for } i = j$$

Following step 164, the controller 34 proceeds to step 168 in which it computes the process noise matrix $Q_K$ as the sum of the real process noise matrix $Q_{RK}$ determined in step 162 and the fictitious process noise matrix $Q_{FK}$ determined in step 164.

Concurrent with steps 164 and 168, the controller 34 in step 166 computes the error state transition matrix $\phi_\epsilon$ as follows:

$$\phi_\epsilon = I + F_\epsilon \Delta t + F_\epsilon \Delta t_2/2 \tag{18}$$

where $F_\epsilon$ is the error state dynamics matrix.

Again, the process for converting the state equations to error state equations and then to matrix form can be found in Gelb et al., supra.

Following steps 166 and 168, the controller 34 proceeds to step 170 in which it calculates the new or current covariance matrix $P_N$ as follows:

$$P_N \phi_\epsilon P_o \phi_\epsilon^T + Q_K \tag{19}$$

Next, in step 172 the controller 34 determines if $N=N_{MAX}$, where N is the number of consecutive discrete time point samples which have been processed through the Kalman filter 56 (FIG. 2A) as represented by steps 158–170 since last updating the state vector X. $N_{MAX}$ is a predefined number representing the maximum number of data samples which are to be processed by the Kalman filter prior to each update of the state vector X. If N is not equal to $N_{MAX}$ in step 172, the controller 34 returns to step 158 and the state transition matrices, $\phi$ and $\phi_\epsilon$ as are updated in the above described steps 158–170 which are repeated for the next data sample. If N does equal $N_{MAX}$ as determined in step 172, the controller 34 proceeds to step 174.

In step 174, the controller 34 analyzes the measured data relating to wheel speed, aircraft velocity and acceleration, and torque in conjunction with the state estimates provided by the Kalman filter to determine whether the wheel 40 is in a skid condition. As will be described in more detail below in connection with FIGS. 7, 8A1, 8A2 and 8B, the controller 34 in step 174 of a preferred embodiment preforms four tests to see if the wheel 40 is in a skid. In addition, the controller 34 performs two tests to determine when a skid event is over. On the transition from not skidding to skidding, a skid start flag is set. This indicates the covariance matrix P for the Kalman filter 56 should be reset. Summarizing for now, the tests to determine if the wheel 40 is in a skid are based on i) a comparison between the estimated wheel speed $\omega$ and the measured wheel speed $\omega_m$; ii) a comparison between the estimated slip ratio and the estimated peak of the mu-slip curve; iii) the estimated slip ratio; and iv) the estimated wheel acceleration $\dot{\omega}$. Upon the controller 34 initially detecting a skid occurring based on such tests as described below, a SKIDSTART flag is set internally. The two tests to determine if a skid is over involve i) a comparison of the estimated slip ratio with the estimated peak location $r_p$; and ii) determining if the estimated slip ratio has dropped below a predefined ratio as discussed below.

Next, in step 176 the controller 34 determines if the SKIDSTART flag has been set previously in step 174 so as to indicate the beginning of a skid condition. Ideally, the Kalman filter within the controller 34 is designed to cause the brake system to apply pressure to the brake assembly 38 in order to operate at or near the peak of the mu-slip curve and to avoid causing a skid condition. Nevertheless, in the event a skid occurs due to abnormal runway conditions, wheel conditions, etc., as detected in step 174, the controller 34 proceeds from step 176 to step 178. As is described in more detail below in connection with FIG. 13, the controller 34 resets its covariance matrix P for the Kalman filter by setting the initial conditions for the filter to prescribed limits. This has been found to allow the Kalman filter to converge significantly faster compared to conventional techniques as will be described below. In the event the covariance matrix P is reset in step 178, the controller 34 then returns to step 150 in FIG. 5A and the above-described steps are repeated.

Referring again to step 176, if the SKIDSTART flag is not set indicating that a skid condition has not initially occurred, the controller 34 proceeds to step 180. In step 180, the controller 34 sets the observation matrices H and $H_e$ for the aircraft wheel speed, velocity, acceleration and brake torque as is discussed in more detail below in connection with FIG. 11. Next, in step 182 the controller 34 sets the real observation noise matrix $R_R$ as is discussed in more detail below. Following step 182, the controller 34 in step 184 sets the fictitious observation noise matrix $R_F$ as is also discussed below. Thereafter, in step 186 the controller 34 sets the combined observation noise matrix R equal to $R_R+R_F$.

Following step 186, the controller 34 proceeds to step 188 in which it computes the Kalman gain $\bar{K}$ using conventional techniques as follows:

$$\bar{K}=PH_e^T[H_ePH_e^T+R]^{-1} \quad (20)$$

Next, in step 190 the controller 34 updates the state vector X, again using conventional Kalman filter techniques, as follows:

$$X_N=X_O+\bar{K}(z(i)-HX_O) \quad (21)$$

where z represents the measurement vector and z(i) represents the particular element.

Following step 190, the controller 34 goes to step 192 in which it performs a range check with respect to the respective system parameters. As is described more fully below in connection with FIG. 14, the controller 34 determines in step 192 whether any of the system parameters within the state vector X fall outside a predefined range during braking control. If yes, the controller 34 sets an internal initialization flag INIT indicating that the Kalman filter within the controller 34 is to be initialized/reinitialized. As previously described, the controller 34 in step 152 detects whether the INIT flag has been set and initializes the controller 34 based thereon. The controller 34 then proceeds from step 192 to step 194 in which it updates the covariance matrix P as follows:

$$P_N=(I-\bar{K}H_e)P_O \quad (22)$$

It will be appreciated that steps 180–194 as represented in FIG. 5B will be carried out for each z(i) observation. The Kalman filter within the controller 34 processes the data in order to update the system parameters which are then utilized to carry out the prescribed control laws. Following step 194, the controller 34 returns to step 150 as shown.

OBSERVABILITY

Prior to describing the various steps represented in FIGS. 5A and 5B in detail, it will be useful to discuss the role of observability in the present invention for optimizing the performance of the controller 34. In order for a Kalman filter to be effective, the states must be observable as is known. There are analytical expressions for observability, but they are not really of practical use. From a practical perspective, observability means that one system parameter is uniquely distinguishable from the rest.

Figure 10A:
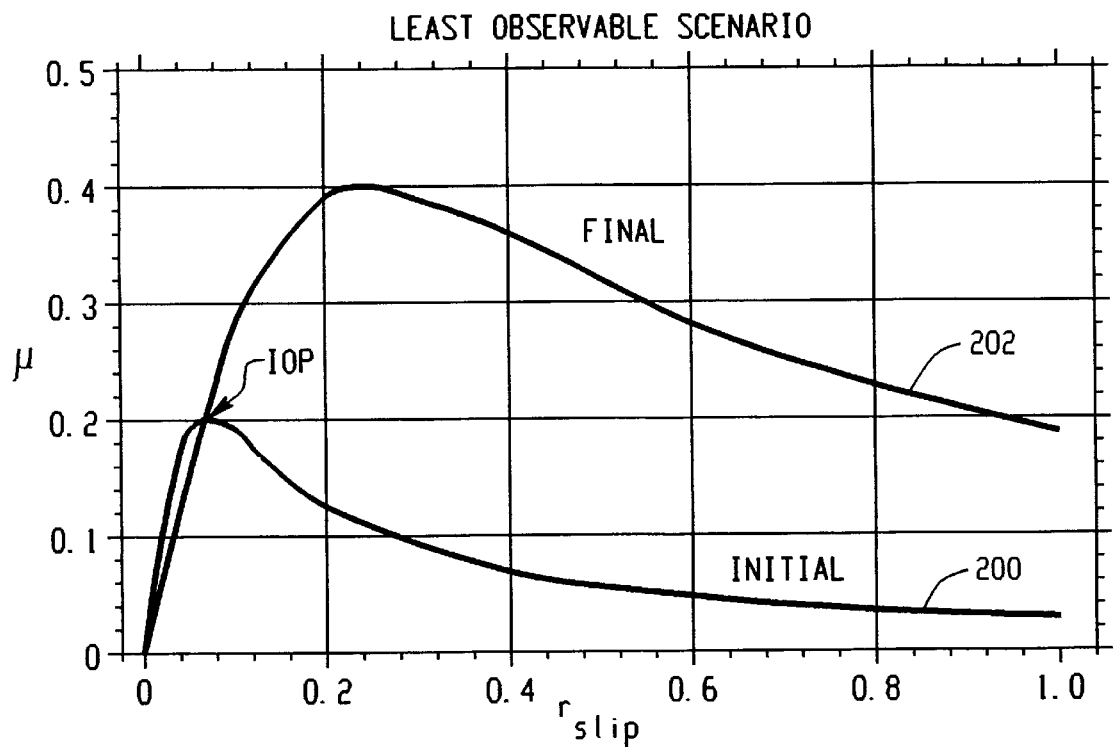
FIG. 10A is a graph representing a least observable scenario in accordance with the present invention.

Observability as it pertains to the mu-slip curve will now be discussed with reference to FIG. 10A. The figure shows two mu-slip curves 200 and 202 intended to represent a transition during operation, e.g., braking during landing of an aircraft. The mu-slip curve 200 represents an initial curve during the transition, and the mu-slip curve 202 represents a final curve as a result of the transition. It is assumed, for sake of example, that the initial operating point (IOP) during the transition is at the peak of the mu-slip curve 200 which coincidentally is also on the mu-slip curve 202. After such a specifically defined transition between mu-slip curves, if the pressure applied to the brake assembly 38 were to remain constant, no observable information will be delivered to any antiskid algorithm, not just the Kalman filter based algorithm of the present invention. This is because the slip ratio will remain the same which means that the developed friction will stay the same. Therefore, the wheel deceleration remains the same and hence the aircraft deceleration. Any antiskid algorithm has to have the pressure applied to the brake arbitrarily perturbed to generate observable information.

According to one aspect of the present invention, it has been noted that the aforementioned unobservable condition occurs when the new operating points of friction peak amplitude $\mu_p$ and location $r_p$ (FIG. 4) are greater than the old. Conversely, they are most observable when the new operating points of friction peak amplitude $\mu_p$ and location $r_p$ are lesser than the old. Thus, in accordance with the present invention the controller 34 sets the initial conditions for the friction peak amplitude $\mu_p$ and location $r_p$ toward the high end of their anticipated range.

For example, runway friction is generally considered to have a peak value $\mu_p$ between 0.1 and 0.6. As a result, the controller 34 as part of the initialization/reinitialization in step 154 (FIG. 5A) sets the peak amplitude $\mu_p$ to 0.6 as discussed below in relation to FIG. 12. The covariance is then chosen to be 0.5 in order to cover the range as discussed below in connection with FIG. 12. The value 0.6 represents the upper end of the anticipated range according to known characteristics of runway conditions. However, in another application where the upper end and range are represented by some other values, the initial peak amplitude $\mu_p$ and covariance may be set accordingly without departing from the scope of the invention.

Similarly, the peak location $r_p$ of the mu-slip curve in typical runway conditions is generally considered to be located between 5% and 15%. Therefore, in step 154 (FIG. 5A) the initial condition for the peak location $r_p$ is set to be 0.15 so as to be towards the upper end of the expected range.

Figure 10B:
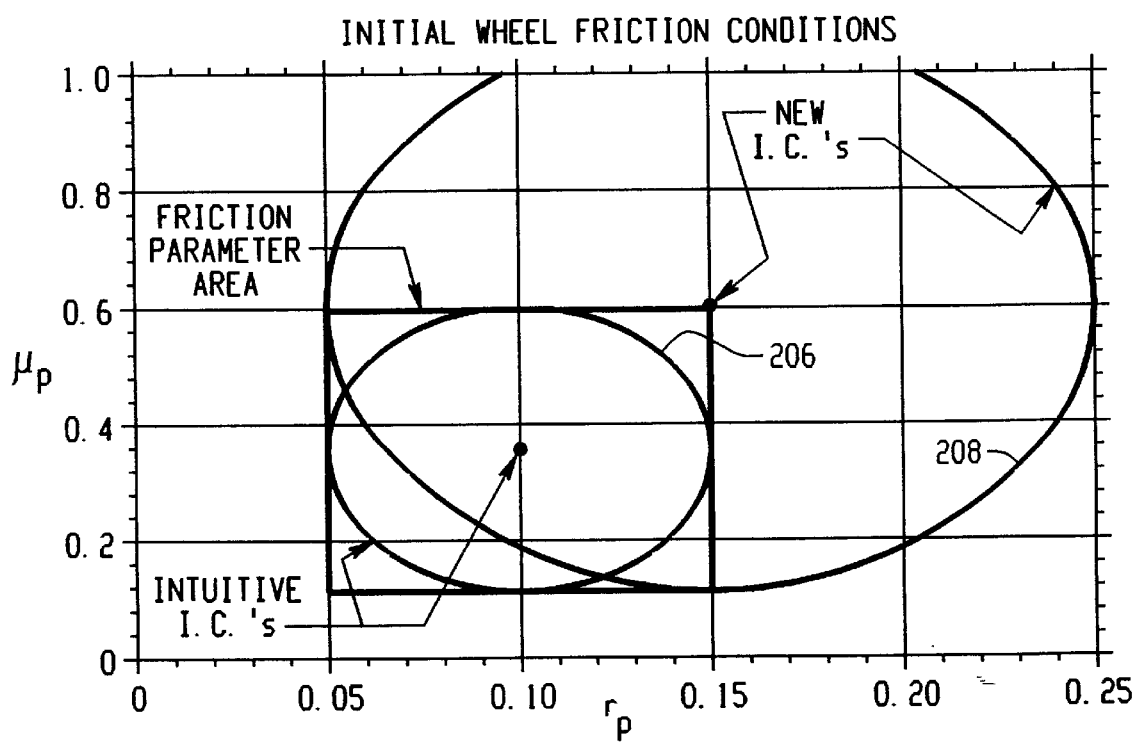
FIG. 10B is a graph representing a resetting of the initial conditions in the event a skid condition occurs in accordance with the present invention.

It has been found that the convergence speed of the Kalman filter based antiskid controller 34 depends significantly on the initial conditions of the friction peak amplitude $\mu_p$ and location $r_p$. By initially setting both of these parameters at or near the higher end of their respective ranges and setting their initial covariances large enough to cover the anticipated range, the controller 34 will converge substantially more quickly as compared to the case where the initial conditions are set in the middle of the respective ranges. This is contrary to the more intuitive filtering approach where the initial conditions would be set towards the middle of their expected ranges with a one sigma covariance. Curve 206 in FIG. 10B illustrates a search area in accordance with such an intuitive approach.

The better choice as determined by the present inventor is to set the initial conditions at or near the maximum expected values and approximately double the covariance. Initially it may appear that such an approach would cause the filter to be slower because the search area is quadrupled in area as represented by curve 208 in FIG. 10B. However, the expansion in search area is more than made up for from the fact that the number of convergence paths is reduced by four. Namely, since the initial condition on the wheel friction parameters is set to the high end of the region where the true parameters lie, the trajectory the estimates take towards the true values will tend to be downward. Furthermore, the large initial covariance of the wheel friction parameters increase the Kalman gain for these parameters and hence increase its convergence speed. Tests have shown the controller 34 to converge over five times faster by setting the initial conditions at their maximum expected values in accordance with the present invention as compared to a more conventional approach.

Observability of the Kalman filter based controller 34 is also increased in accordance with the present invention by adding an "excitement" signal. As is discussed below in relation to FIG. 6, an excitement signal is added to a slip ratio set point used in the calculation of the command pressure $P_c$ provided by the controller 34 to the actuator 36. Referring again to FIG. 10A, assume again that the initial operating point IOP is where the mu-slip curves 200 and 202 intersect as shown. By varying the pressure signal, the slip ratio $r_{slip}$ is also varied. The Kalman filter within the controller 34 then sees a segment of the current mu-slip curve rather than just a point. This segment is uniquely determined and hence observable. The frequency of this excitement signal is chosen to be different from the aircraft gear walk frequency (e.g., the frequency where the landing gear/wheel combination acts as a pendulous arm and oscillates unduly as is known). As is discussed below, the amplitude in terms of slip ratio is about ±7% which, because the mu-slip curves tend to be flat near the top, results in a pressure variation of about ±2% in the context of aircraft antiskid applications.

Figure 6:
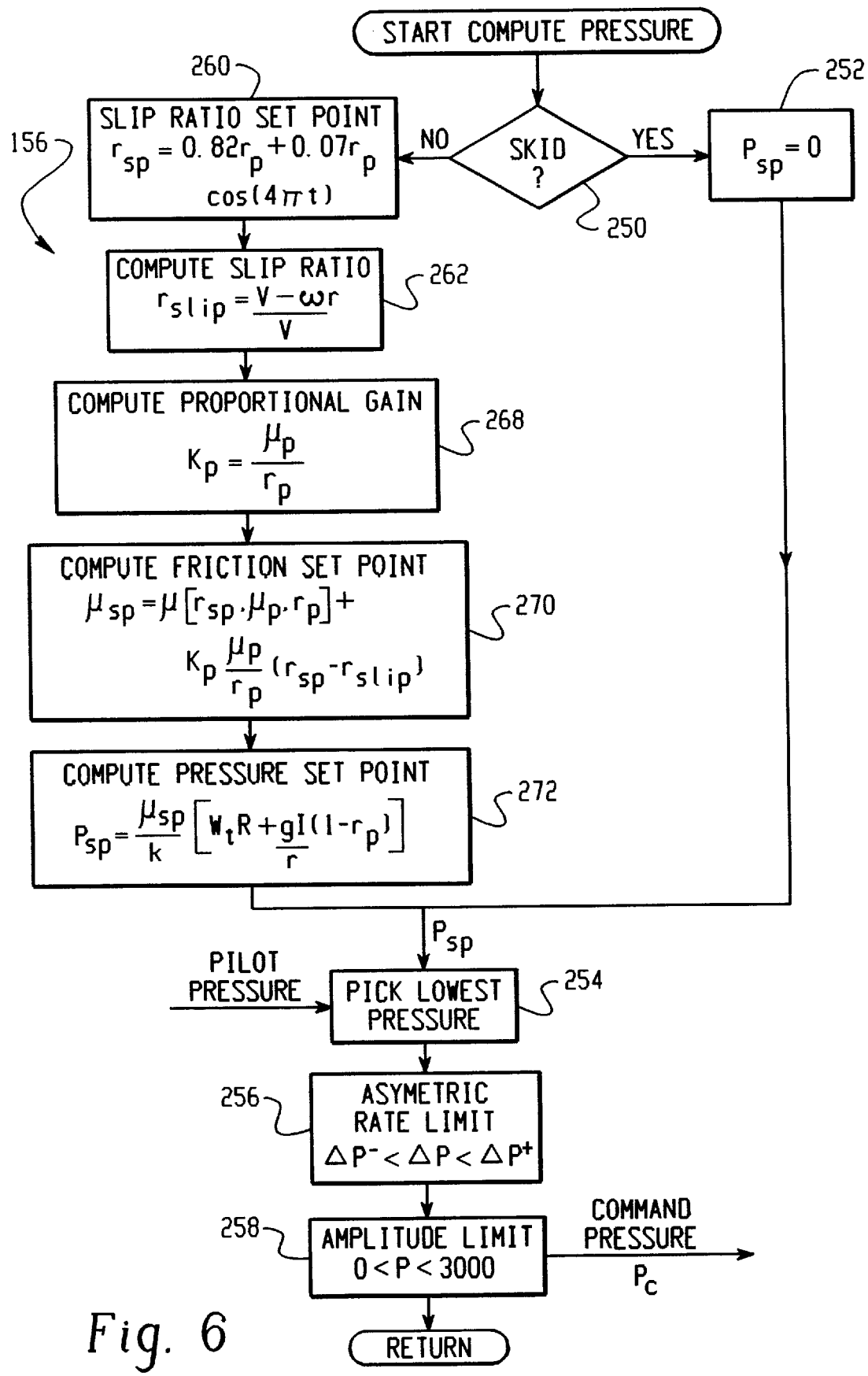
FIG. 6 is flowchart representing a routine for computing a brake command pressure signal delivered to the brake actuator in accordance with the present invention.

Referring now to FIG. 6, the procedure for computing the command pressure $P_c$ (step 156) will now be discussed. Generally speaking, in the exemplary embodiment the pressure calculation is either zero or the peak pressure $\mu_p$ depending on whether a skid is determined to be occurring or not. As will be described below, the pressure is set starting with the peak pressure (Eq. 13) calculation which is augmented with a proportional gain term which increases pressure based upon how far the slip ratio parentheses set point is from the estimated slip ratio. The slip ratio set point ($r_{sp}$) is then slightly less than the estimated slip ratio peak with the aforementioned excitement signal imposed. The proportional gain is adaptive as it is dependent on the average slope of the mu-slip curve and the certainty with which this slope is known. The purpose of the proportional gain is two-fold: (1) increase the response speed; and (2) drive the pressure signal to a higher value when the estimate differs from the set point greatly. The pressure signal is then rate limited where the rate limit is a tuning factor for a particular braking system based upon dynamometer testing.

Describing now the procedure in detail, step 156 begins with the controller 34 determining in step 250 whether a skid is occurring. Whether a skid is occurring or not is determined in step 250 based on if an internal SKID flag has been set or not. The routine for determining whether a skid is occurring and setting the SKID flag accordingly is described in detail below in relation to the flowchart of FIG. 7. If the SKID flag=1 as determined in step 250, indicating that a skid is occurring, the controller 34 proceeds from step 250 to step 252. In step 252, the controller 34 sets a pressure set point parameter $P_{sp}$ equal to zero. The controller 34 then proceeds to step 254 in which the controller 34 compares the current pilot pressure signal (PILOT PRESSURE), indicating the amount of braking requested by the pilot, to the pressure set point $P_{sp}$.

Specifically, in step 254 the controller 34 selects as pressure P the lowest pressure between the pressure set point $P_{sp}$ and the current PILOT PRESSURE. In this case where step 254 immediately follows step 252, the controller 34 would select $P=P_{sp}=0$ since the PILOT PRESSURE could not be a negative value.

Following step 254, the pressure signal P is rate limited in step 256 to ensure that the change in the pressure signal P (ΔP) since the previous observation is within an acceptable predefined range (e.g., between ΔP− and ΔP+). The pressure signal P is then amplitude limited in step 258 to ensure the pressure signal P does not exceed a predefined amplitude range (e.g., between 0 and 3000 psi). The particular ranges in steps 256 and 258 are predetermined so as not to exceed the limitations (e.g., structural and/or response) of the particular wheel 40 and brake assembly 38 Such ranges may be determined from dynamometer testing, for example. Following the rate limiting and amplitude limiting of steps 256 and 258, the pressure signal P is then output by the controller 34 as the brake command pressure $P_c$ as part of step 258.

Referring back to step 250, if the flag SKID=0 so as to indicate a skid is not occurring, the controller 34 proceeds to step 260 to determine the appropriate command pressure $P_c$ to be applied to the brake 38 to provide braking action without causing a skid condition. It is noted that although it is referred to herein as there being no skid occurring when SKID=0, this is by definition. Ideally some skid is occurring since the mu-slip curve indicates that maximum friction and hence stopping can occur if there is sufficient slipping or skidding to remain at the peak. Thus, a skid condition is defined by the particular parameters set forth herein. Other parameters could be used in other embodiments as will be appreciated.

In step 260, the controller 34 computes the slip ratio set point $r_{sp}$. The slip ratio set point $r_{sp}$ governs the amount of pressure that is applied to the brake assembly 38. As mentioned above, the slip ratio set point $r_{sp}$ is the estimated slip ratio peak with an excitement signal imposed. The excitement signal represents a time variation in the set point which allows various parameters in the system to become more observable in the steady state. The particular nature of the time-variant excitement signal is not critical. For example, one could use a sinusoid, sawtooth, ramp, or other periodic waveform as the excitement signal. The maximum amplitude of the excitement signal preferably is limited to the maximum amount of slip a wheel 40 can deliver. In addition, preferably the maximum amplitude of the excitement signal is limited by the amount of loss of braking efficiency which can be tolerated in the system. Also, the frequency of the excitement signal preferably is different from the aircraft gear walk frequency as previously mentioned.

In the preferred embodiment, the slip ratio set point $r_{sp}$ is calculated in step 260 as follows:

$$r_{sp}=0.82r_p+0.07r_p*cos[4\pi t] \quad (23)$$

where t represents time and the excitement signal is a sinusoid having a magnitude of 0.07 times the friction peak location $r_p$. The frequency of the excitement signal may be, for example, 2 Hz.

Equ. 23 indicates that the slip ratio set point $r_{sp}$ in the steady state will fluctuate between 0.75 $r_p$ and 0.89 $r_p$ with an average of 0.82 $r_p$. Current antiskid systems are generally accepted to operate at 90% efficiency. This occurs at $r_{slip}$= 0.63 $r_p$ as may be ascertained from Equ. 15c. The preferred embodiment is to provide 98% braking efficiency which occurs at $r_{slip}$=0.82 $r_p$. The amplitude of the signal is chosen so as to avoid going over the peak of the mu-slip curve and avoid the excitation of landing gear resonant frequencies unduly. A 2% modulation in pressure has been found to be an acceptable compromise. Modulating the slip ratio 7% will give 2% pressure modulation which translates into a 2% modulation of drag force on the axle, for example. It will be appreciated that the selected average value and excitement signal amplitude may vary depending on the particular aircraft, wheel configuration, etc. For example, if the specific mu-slip curve for the wheel (tire) has a specific β value other than 2, then the 82% value and the 7% value can be modified to achieve the goal of 98% efficiency with 2% modulation of pressure. Also, other efficiencies and modulations may be selectively obtained as desired.

Following step 260, the controller 34 proceeds to step 262 in which it computes the slip ratio $r_{slip}$ as follows:

$$r_{slip} = (V - \omega r)/V_t \qquad (24)$$

where V is the estimated A/C velocity (Equ. 1), ω is the estimated angular velocity of the wheel 40 (Equ. 2), and r is the estimated radius of the wheel 40 (Equ. 8).

Next, in step 268 the controller 34 computes an adaptive proportional gain term to augment the slip ratio set point $r_{sp}$ obtained in step 260. The proportional gain term is proportional to the estimated average slope of the mu-slip curve. The effect of the proportional gain term is to provide a higher level of control when a steep curve is encountered and more subtle control when low wheel friction occurs.

Ordinarily, when the value of μ step changes from low to high (e.g., from the low of its expected range (0.1) to the high of its expected range (0.6)), a Kalman filter will be slow to respond. To speed up the response, the controller 34 in the present invention causes the brake pressure to "sweep" up the mu-slip curve in order to see the peak. In the present embodiment, this is accomplished by providing an adaptive proportional gain term $K_p$ selected to increase pressure applied to the brake 38 based upon how far the slip ratio set point $r_{sp}$ is from the estimated slip ratio $r_p$.

Accordingly, in step 268 the adaptive proportional gain term $K_p$ is computed as follows:

$$K_p = \mu_p / r_p \qquad (25)$$

It will be appreciated that this value may be scaled up or down based up specific conditions and requirements.

After the slip ratio set point $r_{sp}$ and proportional gain $K_p$ have been determined, the controller 34 proceeds to step 270 in which it calculates the friction set point $\mu_{sp}$ as follows:

$$\mu_{sp} = \mu[r_{sp}, \mu_p, r_p] + K_p((\mu_p/r_p)(r_{sp} - r_{slip})) \qquad (26)$$

The first term in Equ. 26 represents a constant term and the second term represents a proportional term with respect to the friction set point $\mu_{sp}$. The friction set point $\mu_{sp}$ is then used by the controller 34 to compute the pressure set point $P_{sp}$ in step 272 as follows:

$$P_{sp} = (\mu_{sp}/k)(W_t r + g\ I(1 - r_{sp})/r) \qquad (27)$$

where k represents the estimated torque/pressure ratio.

Using the pressure set point $P_{sp}$ as determined from the Kalman estimates and the various control laws applied thereto as discussed above, the controller 34 then proceeds from step 272 to step 254 where the lowest pressure is selected as previously described. Again, the PILOT PRESSURE command or the pressure set point $P_{sp}$ calculated in step 272, whichever is lower, is subjected to rate and amplitude limiting in steps 256 and 258, respectively. The command pressure $P_c$ is then output to the brake actuator 36.

Thus, the flowchart of FIG. 6 illustrates the manner in which the appropriate brake pressure is applied to the brake actuator 36 using the Kalman filter estimates provided within the controller 34. Use of the excitement signal and proportional gain significantly increase the observability of the Kalman filter in estimating the system parameters and converging quickly to the "true" system values.

SKID DETECTION

Figure 7:
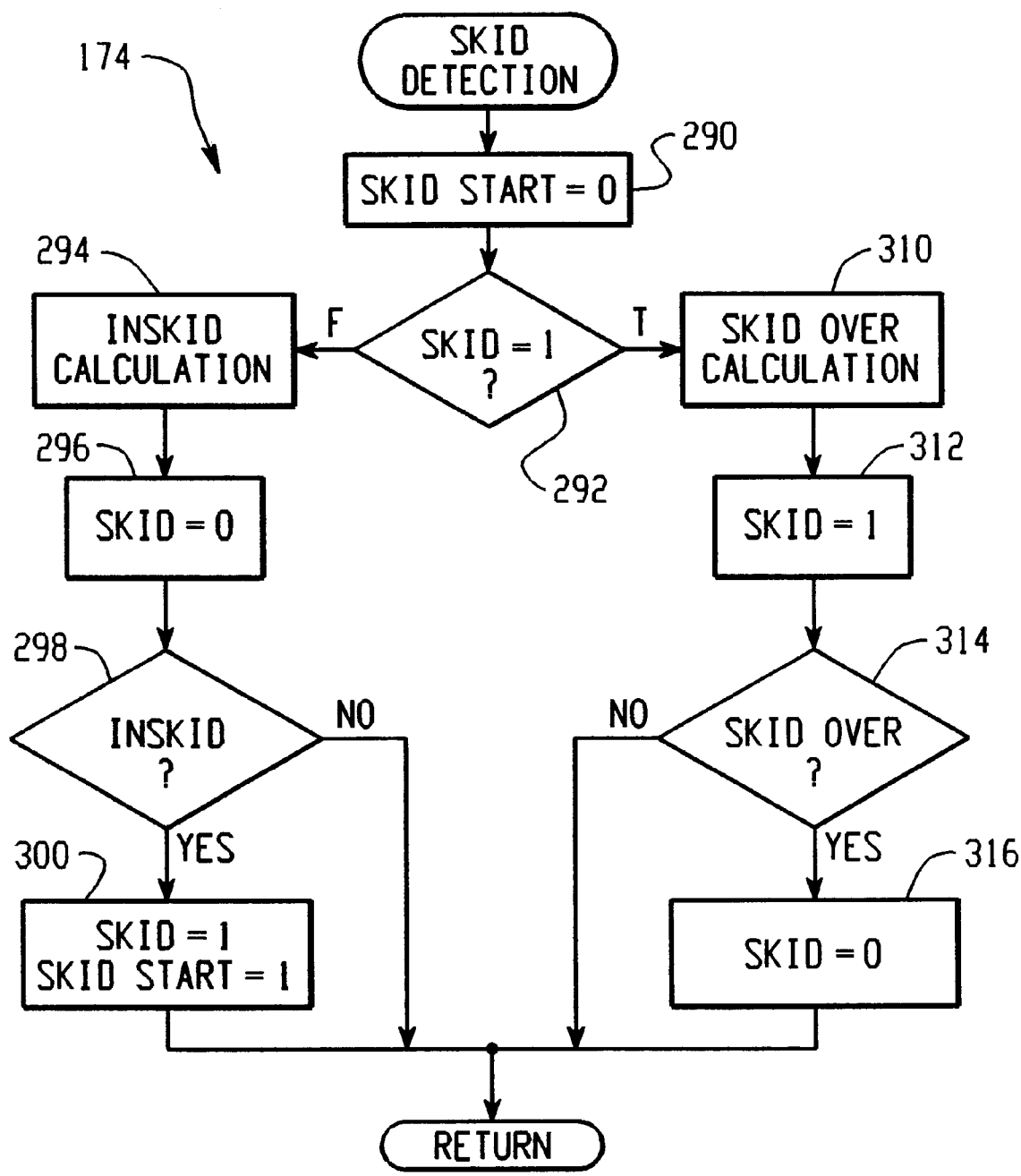
FIG. 7 is a flowchart illustrating a routine for determining whether the brake has begun or ended a skid condition in accordance with the present invention.
Figure 8B:
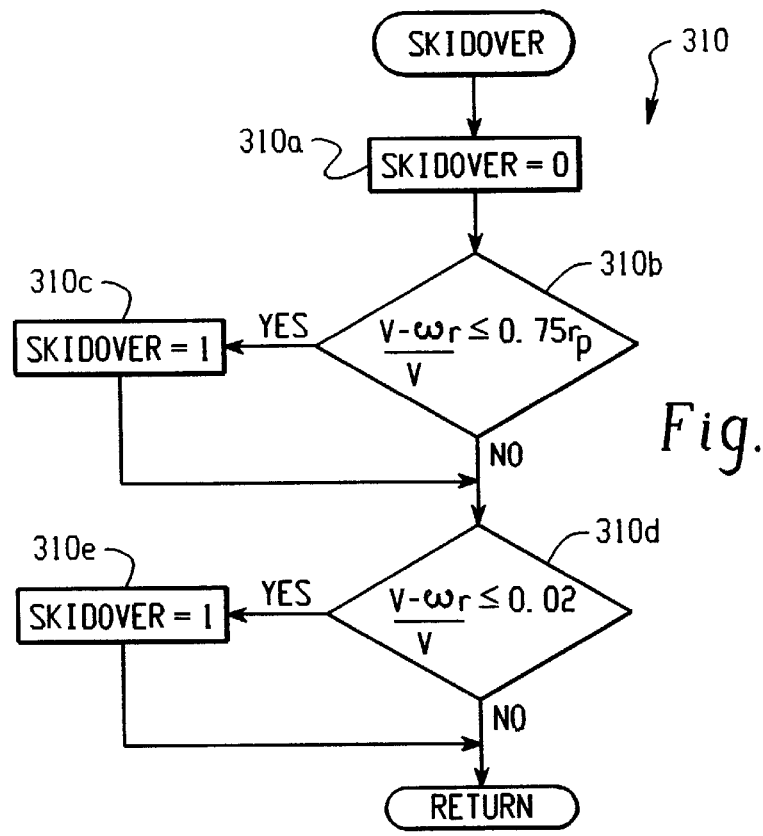
FIG. 8B is a flowchart illustrating a routine for detecting whether a skid condition is not occurring in accordance with the present invention.

Of course a key to any antiskid control system is the detection of a skid condition. According to the present invention, a skid condition is detected based on the process which will now be explained with reference to FIGS. 7–9. Referring initially to FIG. 7, shown is a procedure which the controller 34 carries out in step 174 (FIG. 5B) discussed above. Four tests are made to see if the wheel 40 is in a skid and two tests are made to determine when a skid condition is over. On the transition from not skidding to skidding, the SKIDSTART flag is set internally by the controller 34. This indicates the covariances should be reset as discussed above in relation to step 178 of FIG. 5B. Summarizing briefly, the four tests made to determine if the wheel 40 is in a skid are:

1. If the wheel speed estimate ω varies from the wheel speed measurement $\omega_m$ by 3.5 standard deviations, an INSKID flag is set to on.
2. If the estimated slip ratio is 1 standard deviation past peak, the INSKID flag is set to on.
3. If the estimated slip ratio is over 0.25, the INSKID flag is set to on.
4. If the wheel acceleration is less than $-\mu_p g(1 - r_p)/r$, the INSKID flag is set to on.

There are two tests to see if the skid is over. An objective of the present invention in accordance with the preferred embodiment is to not let the wheel speed drop below a predetermined portion (e.g., 40%) of the peak slip ratio $r_p$ to avoid diminishing returns on observability as discussed more fully below. Since it takes a finite amount of time to actuate the brake 38 and decelerate the wheel 40 (due to rotational inertia), it has been found that the brake reapplication should occur when the wheel 40 passes a slip ratio of 0.75 $r_p$, for example. This value may change based upon wheel size, vehicle weight, etc., as will be appreciated. The second condition is meant to be effective at low aircraft speed when fidelity in the peak slip ratio $r_p$ estimate may be low.

The skid off conditions denoting the end of a skid are:

1. If the slip ratio is less than 0.75 $r_p$, a SKIDOVER flag is set to on.
2. If the slip ratio is less than 0.02, the SKIDOVER flag is set to on.

Referring now specifically to FIG. 7, in step 290 the controller 34 sets the internal SKIDSTART flag equal to 0 so as to enable the controller 34 to identify the start of a skid. Next, in step 292 the controller 34 determines if the SKID flag (described below) is already true (SKID=1) indicating the wheel 40 had been identified as being in a skid condition based on the previous iteration. If the SKID flag is not true (i.e., SKID=0), the controller 34 proceeds to step 294. In step 294, the controller 34 determines whether the wheel 40 is in a skid condition based on the state estimates.

The preferred routine for determining whether the wheel 40 is in a skid in step 294 is shown in detail in FIG. 8A1 and 8A2. Beginning in step 294a, the controller 34 resets an INSKID flag to 0. In concurrent steps 294b and 294c following step 294a, the controller 34 sets the real wheel speed observation noise matrix $R_R(2,2)$ and the wheel speed observation matrices H and $H_\epsilon$, respectively. With regard to step 294b, real wheel speed observation noise matrix $R_R$ is set as will be described more fully below. As for step 294c, the wheel speed observation matrices H and $H_\epsilon$ are set such that $H = H_\epsilon = [0,1,0,0,0,0,0,0]$.

Following steps 294b and 294c, the controller 34 proceeds to step 294d in which it calculates a wheel speed rejection ratio $\omega_{rej}$ as follows:

$$\omega_{rej}=(|z(2)-H\ |)/(H_\epsilon PH_\epsilon^T+R_R)^{1/2} \quad (28)$$

where z(2) represents the wheel speed measurement.

Following step 294d, the controller 34 in step 294e determines if the wheel speed rejection ratio $\omega_{rej}$ is greater than 3.5. In other words, the controller 34 determines if the wheel speed estimate varies from the measured wheel speed by more than 3.5 standard deviations. If yes, the controller 34 sets the INSKID to 1 in step 294f. Thereafter, the controller 34 proceeds to step 294g. If no in step 294e, the INSKID flag remains set to 0 and the controller 34 continues to step 294g.

The controller 34 in step 294g sets "past peak" observation matrices H and $H_\epsilon$ as follows:

$$H=[\omega r/V^2,-r/V,0,0,-1,0,0,0]$$

$$H_\epsilon=[\omega,r/V^2,-r/V,0,0,-1,0,0,-\omega/V]$$

Next, in step 294h the controller 34 calculates the past peak rejection ratio $r_{prej}$ using the past peak observation matrices from step 294g as follows:

$$r_{prej}=H\ X/(H_\epsilon PH_\epsilon^T)^{1/2} \quad (29)$$

The controller 34 next in step 294i determines if the past peak rejection ratio $r_{prej}$ determined in step 294h is greater than 1. In other words, the controller 34 determines if the estimated slip ratio is greater than 1 standard deviation past peak. If yes, the INSKID flag is set to 1 in step 294j and the controller proceeds to step 294k. Otherwise, the INSKID flag remains at its current setting and the controller 34 proceeds directly to step 294k.

The controller in step 294k determines if the estimated slip ratio (V−ωr)/V is over 0.25. If yes, the INSKID flag is set to 1 in step 294l. Then the controller 34 proceeds to step 294m. If no in step 294k, the controller 34 proceeds directly to step 294m.

The controller 34 in step 294m calculates the wheel acceleration based on the state estimates as follows:

$$\dot{\omega}=(1/I)[\mu[(V-\omega r)/V,\mu_p,r_p]W_t r-kP] \quad (30)$$

Next, in step 294n the controller 34 determines if the wheel acceleration $\dot{\omega}$ is less than $-\mu_p g(1-r_p)/r$ which is representative of the peak acceleration which occurs when operating at the peak of the curve as described in Equ. 12. If yes in step 294n, the controller 34 sets the INSKID flag to 1 in step 294o. Thereafter, the controller 34 completes step 294 and returns to step 296 in FIG. 7. If no in step 294n, the controller 34 simply proceeds directly to step 296. It will be appreciated that the quantity $\mu_p g(1-r_p)/r$ may be scaled up or down.

Referring back to FIG. 7, following step 294 the controller 34 proceeds to step 296 in which a SKID flag is set to 0. Next, in step 298 the controller 34 determines whether the wheel 40 is in a skid condition by virtue of the INSKID flag being set to 1 in step 294. If yes, the controller 34 proceeds to step 300. Otherwise, the controller 34 proceeds to step 176 in FIG. 5B. In step 300, the controller 34 sets the SKID flag to 1 and the SKIDSTART flag to 1 to indicate the wheel 40 has been identified as transitioning from a no skid condition to a skid condition as will be appreciated. The controller 34 then returns to step 176 in FIG. 5B.

If in step 292 the SKID flag is already equal to 1 indicating the wheel was already in a skid condition, the controller 34 proceeds to step 310. In step 310 the controller 34 determines whether the skid condition has ended. The process of step 310 will now be described in detail with reference to FIG. 8B. Specifically, beginning in step 310a the controller 34 sets a SKIDOVER flag to 0. Next, in step 310b the controller 34 determines if the slip ratio (V−ωr)/V is less than 0.75 times the peak slip ratio $r_p$. As was discussed above in relation to FIG. 6, brake pressure is temporarily released in the event of a skid condition. By considering various factors, it is possible with the present invention to arrive at an optimum point at which to reapply brake pressure at the end of the skid condition.

More particularly, according to the present invention after a skid is detected, brake pressure is relaxed. Pressure is reapplied when the effect of the peak of the mu-slip curve is most prominent. This maximizes observability to the Kalman filter while minimizing loss of braking efficiency. This point has been found to occur at roughly 40% of the peak slip ratio $r_p$.

Figure 9:
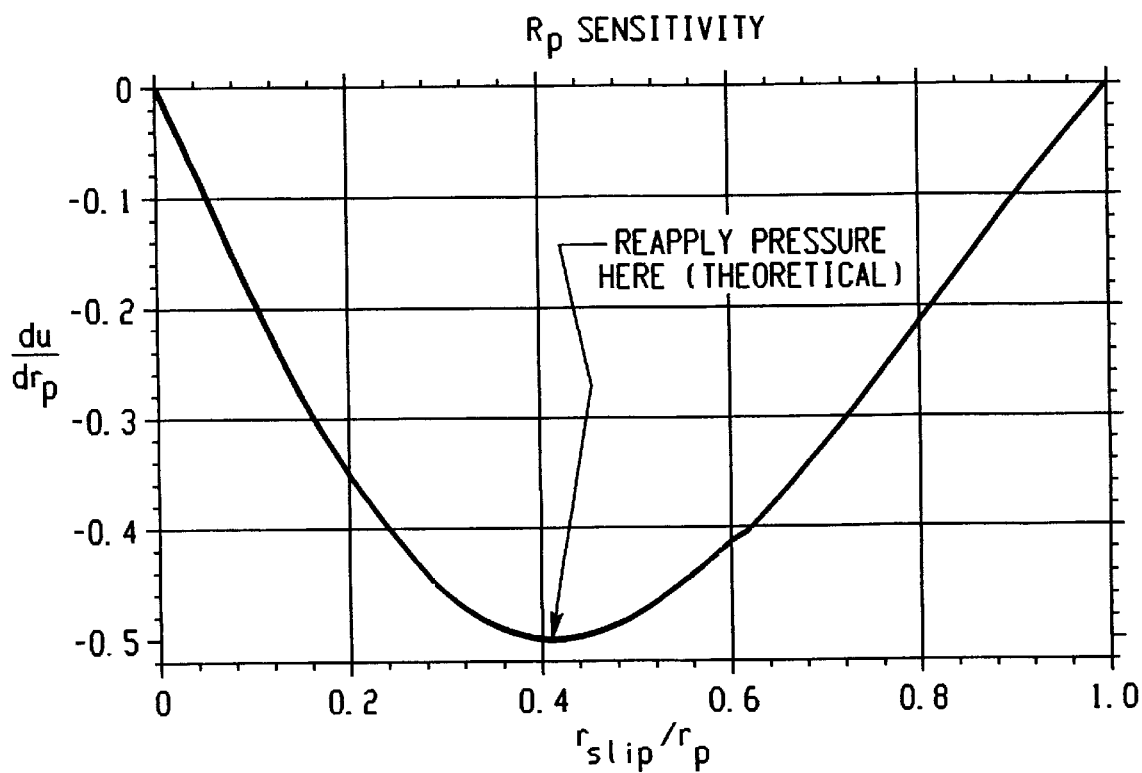
FIG. 9 is a graph which illustrates the sensitivity of the peak slip ratio $r_p$ in accordance with the present invention.

Conventional control philosophy calls for dumping pressure applied to the brake until slip ratio gets to near zero. However, it has been found in accordance with the present invention that there is an optimum slip ratio at which to apply pressure. The curve shown in FIG. 9 illustrates the observability by the Kalman filter based on a comparison of $\delta(\mu)/\delta(r_p)$ in relation to the quantity $r_{slip}/r_p$. The observation matrix entry has a maximum absolute value at about forty percent of $r_p$. This indicates that to maximize observability of $r_p$ one should dump pressure until $r_{slip}<0.40\ r_p$, but dumping pressure any further results in diminishing returns, and reduced braking efficiency due to pressure response.

The observation matrix entry is zero at $r_{slip}/r_p$ equal to one as shown in FIG. 9. This indicates that operating exactly at the peak of the mu-slip curve makes the peak location $r_p$ unobservable at that point. Biasing the operating point off peak with the excitement signal (step 260, FIG. 6) makes this parameter more observable.

Assuming it will take some finite amount of time for the actuator 36 and brake 38 to decelerate the wheel 40 upon receiving a command, it is desirable to detect a point ahead of time at which $r_{slip}$ has not dropped as low as 0.40 $r_p$. In the exemplary embodiment a value of 0.75 times the peak slip ratio $r_p$ has been found to avoid loss of observability within the Kalman filter based controller 34 while taking into account the finite amount of time. This results in the slip ratio $r_{slip}$ typically being about 0.40 $r_p$ when deceleration actually occurs so as to optimize observability. The value of 0.75 $r_p$ can change based on various parameters such as wheel size, vehicle weight, etc., which would affect the rotational inertia of the system and hence the delay associated with decelerating the wheel. In any case, however, pressure is reapplied at a value substantially greater than a slip ratio $r_{slip}$ of zero.

In the event the slip ratio (V−ωr)/V is less than or equal to 0.75 $r_p$ as determined in step 310b, this thereby indicates the end of a skid condition. Thus, the controller 34 goes to step 310c where the SKIDOVER flag is set to 1 to indicate such. The controller 34 then proceeds to step 310d. If in step 310c the slip ratio is not less than or equal to 0.75 $r_p$, the controller 34 proceeds directly to step 310d.

In step 310d, the controller 34 determines if the slip ratio is less than or equal to 0.02. This condition is effective early in the estimation period when $r_p$ may not be known with high fidelity. If yes in step 310d, the SKIDOVER flag is set to 1 in step 310e to indicate the skid is over. Following step 310e, the controller 34 then returns to the flowchart shown in FIG. 7 and specifically proceeds to step 312.

In step 312 the controller 34 sets the SKID flag to 1. Next, the controller 34 proceeds to step 314 in which it determines if the skid condition is over as represented by the status of the SKIDOVER flag. If SKIDOVER=1, the controller 34 proceeds to step 316 in which the SKID flag is set equal to 0. Thereafter, the controller 34 returns to step 176 in FIG. 5B. If SKIDOVER=0 in step 314 so as to indicate the skid is still occurring, on the other hand, the controller 34 proceeds directly from step 314 to step 176 in FIG. 5B.

Figure 11:
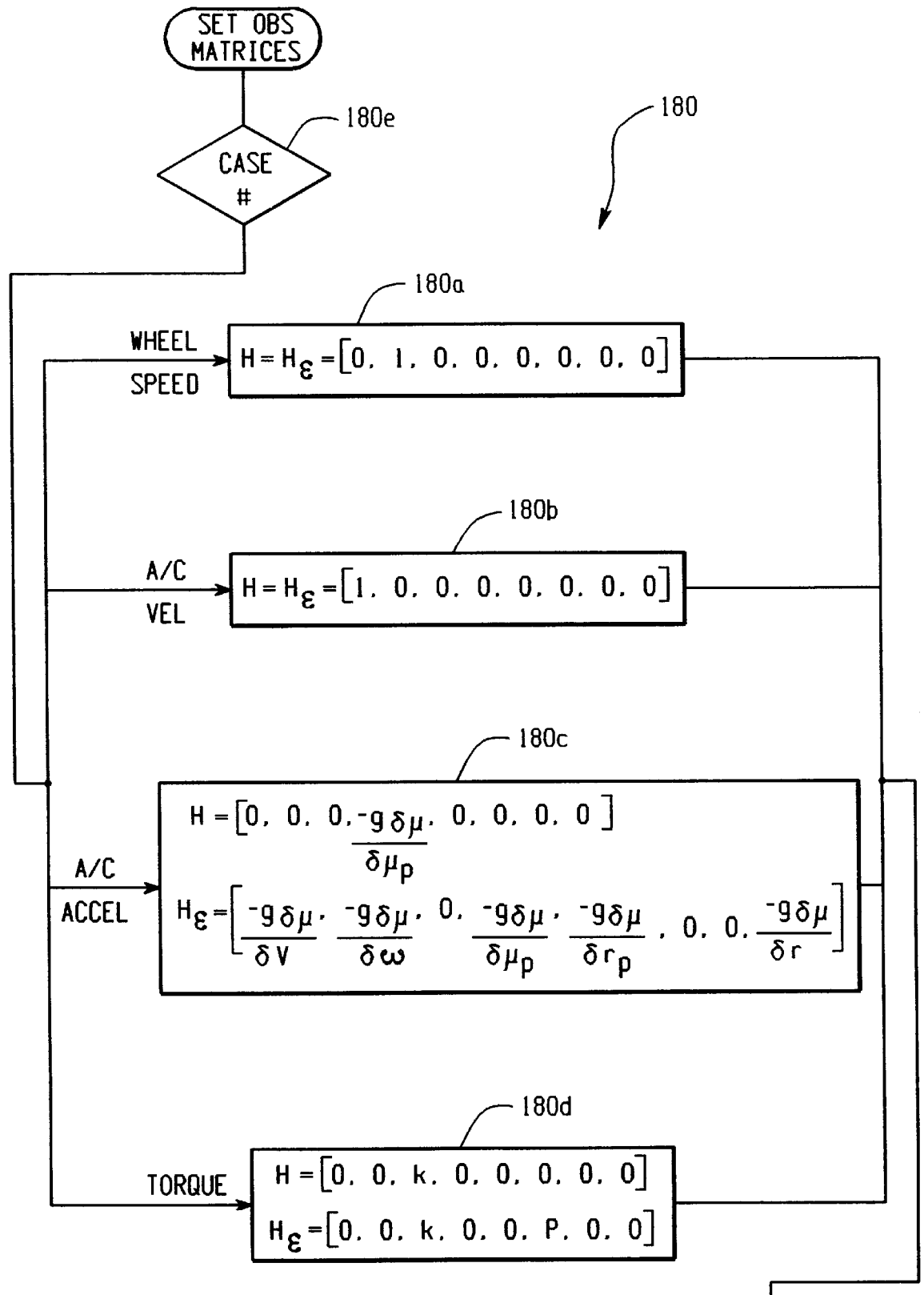
FIG. 11 is a flowchart which illustrates setting of the observation matrices in accordance with the present invention.

Referring now to FIG. 11, the manner in which the observation matrices H and $H_\epsilon$ for each of the wheel speed, aircraft velocity, aircraft acceleration and brake torque are set in step 180 of FIG. 5B will now be described. Step 180 may be represented by individual steps 180a–180d corresponding to the wheel speed, aircraft velocity, acceleration, and brake torque, respectively. Each of steps 180a–180d are carried out with respect to each observation in steps 180–194 in FIG. 5B as represented by block 180e. Specifically, with regard to step 180a the observation matrices for the wheel speed ω are set as follows:

$$H = H_\epsilon [0,1,0,0,0,0,0,0]$$

The observation matrices for the aircraft velocity V are set in step 180b as follows:

$$H = H_\epsilon = [1,0,0,0,0,0,0,0]$$

The observation matrices for the aircraft acceleration $\dot{V}$ are set in step 180c as follows:

$$H = [0,0,0,-g\delta\mu/\delta\mu_p,0,0,0,0]$$

$$H_\epsilon = [-g\delta\mu/\delta V, -g\delta\mu/\delta\omega 0, -g\delta\mu/\delta\mu_p, -g\delta\mu/\delta r_p, 0, 0, -g\delta\mu/\delta r]$$

Finally, the observation matrices for the brake torque are set in step 180d as follows:

$$H = [0,0,k,0,0,0,0,0]$$

$$H_\epsilon = [0,0,k,0,0,P,0,0]$$

Referring briefly to FIG. 12, step 154 (FIG. 5A) relating to initializing/reinitializing the controller 34 is shown in more detail. Specifically, beginning in step 154a the controller 34 measures the wheel speed $\omega_m$ and then initializes the state vector X to its initial state as represented by $X_O$. For example, in step 154a the state vector X is initialized as follows:

$$X = X_0 =$$

| | | |
|---|---|---|
| $V_0$ | $= \omega_0 r_0$ | ft/sec |
| $\omega_m$ | $= \omega_m$ | rad/sec |
| $P_0$ | $= 0$ | psi |
| $\mu_{p0}$ | $= 0.6$ | |
| $r_{p0}$ | $= 0.15$ | |
| $k_0$ | $= 4$ | ft.lb./psi |
| $W_{t0}$ | $= 13800$ | lb. |
| $r_0$ | $= 1.125$ | ft |

It will be appreciated that the initial values $k_0$, $W_{t0}$ and $r_0$ are vehicle specific. Such values are likely to change for a different aircraft.

It is noted that the wheel speed ω is initialized ($\omega_O$) by measuring the output $\omega_m$ of the wheel speed velocity sensor 42 (FIG. 1). The aircraft velocity V is initialized ($V_O$) by multiplying the wheel speed by the nominal wheel radius $r_0$. This has been found to put the initial slip ratio at zero which is in the middle of the linear portion of the mu-slip curve. Mathematical linearization as part of the Kalman filtering can then proceed more efficiently as compared with other possible techniques. For example, it has been found that if the initial velocity $V_O$ is obtained from the aircraft measurement $V_m$, the initial estimated slip ratio may be over peak of the mu-slip curve due to corruption of the measurement by noise. The subsequent numerical linearization will then be of the wrong sign and numerical difficulties may arise.

Following step 154a, the controller 34 then proceeds to step 154b as shown in FIG. 12. In step 154b the controller 34 sets the covariances in the state covariance matrix P to their initial values as represented by the matrix $P_0$. In the exemplary embodiment the initial state covariance matrix $P_O$ is represented as follows:

$$P_0 =$$

| off diagonals | | $P_0(i, j)$ | $= 0$ | for $i \neq j$ |
|---|---|---|---|---|
| V | ⇒ | $P_0(1, 1)$ | $= r_0^2 P_0(2, 2) + \omega_0^2 P_0(8, 8)$ | $(\text{ft/sec})^2$ |
| ω | ⇒ | $P_0(2, 2)$ | $= R(2, 2)$ | $(\text{rad/sec})^2$ |
| P | ⇒ | $P_0(3, 3)$ | $= 200^2$ | $(\text{psi})^2$ |
| $\mu_p$ | ⇒ | $P_0(4, 4)$ | $= 0.5^2$ | |
| $r_p$ | ⇒ | $P_0(5, 5)$ | $= (0.1)^2$ | |
| k | ⇒ | $P_0(6, 6)$ | $= 1^2$ | $(\text{ft.lb./psi})^2$ |
| $W_t$ | ⇒ | $P_0(7, 7)$ | $= 1400^2$ | $(\text{lb})^2$ |
| r | ⇒ | $P_0(8, 8)$ | $= 0.1^2$ | $(\text{ft})^2$ |

It will be noted that covariances for ω, P, k, $W_t$ and r will tend to be vehicle specific as will be appreciated. Such values are likely to change for different aircraft. Following step 154b, the controller 34 returns to step 156 in FIG. 5A.

It is recognized that initializing aircraft velocity from wheel speed introduces an error in the aircraft velocity initial estimate because the wheel radius is also unknown with complete certainty. This is accounted for using well know statistical techniques resulting in the equation above for $P_O(1,1)$. The initial aircraft velocity covariance is then neither too low which might result in divergence nor too high which might result in slow response time.

Referring now to FIG. 13, step 178 (FIG. 5B) for resetting the state covariance matrix P will now be described. Specifically, in step 178a the controller 34 resets the covariance matrix P to $P_R$ as follows:

$$P_R =$$

| off diagonals | $P_R(i, j) = 0$ | for $i \neq j$ |
|---|---|---|

-continued

| | | | |
|---|---|---|---|
| $V$ | $\Rightarrow P_R(1,1) =$ | $5^2$ | $(\text{ft/sec})^2$ |
| $\omega$ | $\Rightarrow P_R(2,2) =$ | $5^2$ | $(\text{rad/sec})^2$ |
| $P$ | $\Rightarrow P_R(3,3) =$ | $200^2$ | $(\text{psi})^2$ |
| $\mu_p$ | $\Rightarrow P_R(4,4) =$ | $\text{reset}[\mu_p, xnom(4), sigmin(4), sigmax(4)]$ | |
| $r_p$ | $\Rightarrow P_R(5,5) =$ | $\text{reset}[r_p, xnom(5), sigmin(5), sigmax(5)]$ | |
| $k$ | $\Rightarrow P_R(6,6) =$ | $\text{reset}[k, xnom(6), sigmin(6), sigmax(6)]$ | $(\text{ft.lb./psi})^2$ |
| $W_t$ | $\Rightarrow P_R(7,7) =$ | $\text{reset}[W_t, xnom(7), sigmin(7), sigmax(7)]$ | $(\text{lb})^2$ |
| $r$ | $\Rightarrow P_R(8,8) =$ | $\text{reset}[r, xnom(8), sigmin(8), sigmax(8)]$ | $(\text{ft})^2$ |

The function "reset" determines how far away the current state estimate (e.g., $\mu_p$, $r_p$, k, $W_t$ and r) is from the nominal value (e.g., xnom(4) through xnom(8), respectively) for the particular aircraft in question, and adds it to a minimum value (sigmin(4) through sigmin(8)), respectively. A "clip" function, making up part of the reset function, then bounds the value between "sigmin" and "sigmax". This value is then squared to arrive at the reset state covariance value. Stated mathematically, $$\text{reset}[x, xnom, sigmin, sigmax] = \text{clip}[sigmin + |x - xnom|, sigmin, sigmax]^2$$

where if $$\text{clip}[x, xmin, xmax] \begin{array}{ll} = x & xmin \leq x \leq xmax \\ = xmin & x < xmin \\ = xmax & x > xmax \end{array}$$

For the exemplary embodiment, the values of xnom, sigmin and sigmax are as follows:

| | | | |
|---|---|---|---|
| $\mu_p$ | $xnom(4) = 0.35$ | $sigmin(4) = 0.25$ | $sigmax(4) = 0.5$ |
| $r_p$ | $xnom(5) = 0.1$ | $sigmin(5) = 0.05$ | $sigmax(5) = 0.1$ |
| $k$ | $xnom(6) = 4$ | $sigmin(6) = 1.0$ | $sigmax(6) = 2.0$ |
| $W_t$ | $xnom(7) = 13800$ | $sigmin(7) = 1400$ | $sigmax(7) = 2800$ |
| $r$ | $xnom(8) = 1.125$ | $sigmin(8) = 0.1$ | $sigmax(8) = 0.1$ |

The result of the reset and clip functions is to independently set the limits of the search space for the one sigma covariance. This has been found to improve the response time of the Kalman filter by up to five times.

FIG. 14 illustrates in detail the range check procedure for setting the initialization (INIT) flag in step 192 of FIG. 5B. Beginning in step 192a, for each system parameter in the state vector X the controller 34 determines whether the respective parameter x(i) for i=1 to 8 falls outside a predefined range xmin(i) to xmax(i). If each of the given parameters x(i) are currently within their respective ranges xmin(i) to xmax(i) such that xmin(i)<x<xmax(i), the controller 34 proceeds to step 192b. In step 192b, the controller 34 sets the INIT flag to 0 (or false) so as to indicate that initialization/reinitialization is not required via step 154.

If in step 192a each of the given parameters x(i) are not currently within their respective ranges xmin(i) to xmax(i) such that for at least one of the parameters x<xmin(i), or x>xmax(i), the controller 34 proceeds to step 192c. In step 192c, the controller 34 sets the INIT flag to 1 (or true) so as to indicate that initialization/reinitialization is required via step 154.

The particular values of xmin(i) and xmax(i) are predefined so as to represent the expected ranges of the particular parameters. Limits for various parameters are known from data provided by the airframe manufacturer. For example, based upon engine power limitations, it is known that aircraft velocity may not exceed certain values. Another example is weight. The aircraft manufacturer knows how much the aircraft will weigh with it's maximum and minimum contingent of fuel, passengers, arms, etc.

PROCESS NOISE AND OBSERVATION NOISE

Real Noise n

Steps 162 (FIG. 5A) and 182 (FIG. 5B) referred to above pertain to computing the real process noise matrix $Q_{RK}$ and real observation noise matrix $R_R$, respectively. Such values are represented by noise n in the state equations. The real process noise and observation noise will depend on the particular system hardware which is implemented as will be appreciated. Such values can be arrived at using conventional techniques. In the exemplary embodiment, the real process noise matrix $Q_{RK}$ can be represented as follows:

$Q_{RK} =$

| | | | |
|---|---|---|---|
| off diagonals | $Q_{RK}(i,j) =$ | $0$ | for $i \neq j$ |
| $V$ | $\Rightarrow Q_{RK}(1,1) =$ | $0^2$ | $(\text{ft/sec})^2$ |
| $\omega$ | $\Rightarrow Q_{RK}(2,2) =$ | $0^2$ | $(\text{rad/sec})^2$ |
| $P$ | $\Rightarrow Q_{RK}(3,3) =$ | $20^2$ | $(\text{psi})^2$ |
| $\mu_p$ | $\Rightarrow Q_{RK}(4,4) =$ | $0^2$ | |
| $r_p$ | $\Rightarrow Q_{RK}(5,5) =$ | $0^2$ | |
| $k$ | $\Rightarrow Q_{RK}(6,6) =$ | $0^2$ | $(\text{ft.lb./psi})^2$ |
| $W_t$ | $\Rightarrow Q_{RK}(7,7) =$ | $0^2$ | $(\text{lb})^2$ |
| $r$ | $\Rightarrow Q_{RK}(8,8) =$ | $0^2$ | $(\text{ft})^2$ |

Real process noise is determined during testing of the braking system. For example, measurements of pressure have shown that the noise on the hydraulics in the exemplary embodiment is 20 psi rms.

With respect to the real observation noise matrix $R_R$ as computed in step 182, such matrix may be represented as follows:

$R_R =$ off diagonals    $R_R(i, j) = 0$   for $i \neq j$ $V_m \Rightarrow R_R(1,1) = 1^2 \; (\text{ft/sec})^2$ $\omega_m \Rightarrow R_R(2,2) = 1^2 \; (\text{rad/sec})^2$ $T_m \Rightarrow R_R(3,3) = 20^2 \; (\text{ft.lb})^2$ $\dot{V}_m \Rightarrow R_R(4,4) = .1^2 \; (\text{ft/sec})^2$ These values come from data sheets provided by manufacturers of the various sensors. If data sheets are not available, the values can be determined by testing. For example, the wheel speed sensor could be spun at a constant rate and data collected. The observation noise could be calculated offline as the variance around the mean value.

Fictitious Noise $n_f$

Steps 164 (FIG. 5A) and 184 (FIG. 5B) referred to above relate to computing the fictitious process noise matrix $Q_{FK}$ and real observation noise matrix $R_F$, respectively. Such values are represented by noise $n_f$ in the state equations.

As will be appreciated, optimal Kalman filtering refers to the situation when the model being used in the filter (the transition, noise and observation matrices) exactly represent the hardware. In practice, however, this never happens and the suboptimal model has to be made to work with the hardware which by definition is optimal. There are two general methods which involve adding "fictitious" noise to the covariance calculation. The fictitious noise accounts for all unmodeled effects. The unmodeled effects can be in the model or the measurement and are referred to as fictitious process noise and fictitious observation noise.

It is often the ability to determine these noises correctly that determines the ability of the filter to operate in practice. Such noises can be determined analytically and/or experimentally. In practice, fictitious observation noise $R_F$ is added to account for modeling errors that cannot be attributed to any specific source while fictitious process noise $Q_{FK}$ focusses on specific modeling errors. For example, there are some analytical methods outlined to deal with this in "Applications of Minimum Variance Reduced-State Estimators" (C. E. Hutchinson et al.; IEEE Transactions on Aerospace and Electronics Systems; September 1975; pp.785–794). The approach is to assume that a model of the parameter exists and that it is in the optimal state vector. The covariance propagation of the soon to be unmodeled state into any modeled state is computed. These terms are then identified as fictitious process noise. A similar approach of initially assuming a parameter is in the state vector during the measurement process results in fictitious observation noise.

The experimental approach is based upon measured data. For example, if one were to observe during testing that the ratio of torque to pressure (k) varies from 4 to 3 during a 10 second stop, fictitious observation noise can be added at such rate.

The Kalman filter based antiskid controller 34 can use a variety of fictitious process and observation noises which are determined both experimentally and analytically. The following are examples but should in no way be construed as limiting to the invention.

Aircraft Velocity V and Wheel Speed $\omega$

The fictitious noise on these two states is zero.

$Q_{FK}(1,1)=0^2$ $Q_{FK}(2,2)=0^2$

Pressure P

The dynamics modeled in a Kalman filter based antiskid controller are dependent on the actuator dynamics being correct. If they are incorrect due to production variations or wear, performance could be less than optimum. According to the present invention, the controller 34 implements a technique for desensitizing the performance of the Kalman filter therein to the dynamics of the actuator 36.

Specifically, the controller 34 takes into account that actuators (hydraulic or electric) have a time response that may change as the unit wears. Since the dynamics of torque, drag and aircraft acceleration are all dependent on the actuator, it is important to account for actuator response. To avoid modeling the response explicitly, the controller 34 models the dynamics of the actuator 36 as a nominal value and changes are modeled as fictitious process noise in the Kalman filter 56. In the preferred embodiment, this is done by setting $Q_{FK}(3,3)$ as follows:

$$Q_{FK}(3,3)=(\Delta t(P_c(t)-P)\sigma_\tau/(\tau^2))^2 \qquad (\text{psi})^2$$

where $\Delta t$ represents the extrapolation time $\Delta t$; $P_c(t)$ represents the command pressure as a function of time; and $\sigma_\tau$ represents the standard deviation of hydraulic response time constant.

Friction Peak Amplitude $\mu_p$

It has been found that by setting $Q_{FK}(4,4)$ as follows, this parameter controls how fast the Kalman filter will respond to a change in $\mu_p$ ($\Delta\mu_p$ in $\Delta T$ seconds) with an extrapolation time $\Delta t$:

$$Q_{FK}(4,4)=(\Delta\mu_p(\Delta t/\Delta T))^2$$

Friction Peak Location $r_p$ $Q_{FK}(5,5)$ has been found to control how fast the Kalman filter will respond to a change in $r_p$ ($\Delta r_p$ in $\Delta T$ seconds) with an extrapolation time $\Delta t$ when set as follows:

$$Q_{FK}(5,5)=(\Delta r_p(\Delta t/\Delta T))^2 \qquad (\text{ft/sec})^2$$

Torque/Pressure Ratio k

The fictitious noise on the torque to pressure ratio has been found to consist of two parts. The first part is a constant which takes into account the change in the brake coefficient of friction as it heats. A second component was found to depend on the rate of change of the brake pressure P.

The first term, $Q_{FK1}(6,6)$, has been found to control how fast the Kalman filter will respond to a change in k ($\Delta k$ in $\Delta T$ seconds) with an extrapolation time $\Delta t$ when set as follows:

$$Q_{FK1}(6,6)=(\Delta k(\Delta t/\Delta T))^2 \qquad (\text{ft.lb/psi})^2$$

The amount of change per unit time can be determined experimentally. The second term, $Q_{FK2}(6,6)$, has been found to control how fast the Kalman filter will respond to a change in k ($\Delta k$ in $\Delta T$ seconds) with an extrapolation time $\Delta t$ with a concurrent pressure rate of P:

$$Q_{FK2}(6,6)=(\Delta k(\Delta t/\Delta T)(P/P_{ave}))^2 \qquad (\text{ft.lb/psi})^2$$

The amount of change per unit time can be determined experimentally. The term $P_{ave}$ is the average rate of change of pressure which occurred while k was varying.

Weight/Wheel Ratio $W_t$ and Wheel Radius r $Q_{FK}(7,7)$ and $Q_{FK}(8,8)$ in the preferred embodiment are simply set to zero. Similarly, all off diagonal values of $Q_{FK}(i,j)$ where $i \neq j$ are set to zero.

As for the real observation noise matrix $R_F$, such matrix can be represented as follows:

$$R_F =$$

$$\begin{aligned}
\text{off diagonals} \quad & R_F(i, j) = 0 \quad \text{for } i \neq j \\
V_m \Rightarrow \quad & R_F(1, 1) = 3^2 \quad (\text{ft/sec})^2 \\
\omega_m \Rightarrow \quad & R_F(2, 2) = 3^2 \quad (\text{rad/sec})^2 \\
T_m \Rightarrow \quad & R_F(3, 3) = 60^2 \quad (\text{ft·lb})^2 \\
\dot{V}_m \Rightarrow \quad & R_F(4, 4) = .2^2 \quad (\text{ft/sec}^2)^2
\end{aligned}$$

It will be appreciated by those skilled in the art that the plant model is often unknown or poorly known. The values of fictitious observation noise are often determined by trial and error until suitable performance is obtained.

Thus, it will be appreciated that the antiskid control system using Kalman filter techniques in accordance with the present invention provides for quick and efficient braking. Although the invention has been shown and described with respect to certain preferred embodiments, it is obvious that equivalents and modifications will occur to others skilled in the art upon the reading and understanding of the specification. For example, the use of a excitement signal need not be limited to increasing the observability of the slip ratio set point as described above. A excitement signal can be utilized in connection virtually any of the other parameters as will be appreciated.

Furthermore, it will be appreciated that state estimation techniques other than a Kalman filter in a preferred embodiment may be used in accordance with the present invention for obtaining the state estimates disclosed herein.

The present invention includes all such equivalents and modifications, and is limited only by the scope of the following claims.

What is claimed is:

1. A brake control system for controlling an amount of braking force applied to a wheel of a vehicle running on a surface, comprising:
   a sensor for measuring a speed of the wheel and for providing an output signal indicative of the speed; and
   a controller, operatively coupled to the sensor, which implements a Kalman filter to estimate an amplitude and location of a peak in a mu-slip curve representative of a coefficient of friction between the wheel and the surface based on the output signal of the sensor, and which controls the amount of braking force applied to the wheel based on the amplitude and location of the peak.

2. The system of claim 1, wherein the amplitude and location of the peak are each modeled by a system state equation implemented within the controller.

3. The system of claim 2, wherein the amplitude and location of the peak are modeled substantially as constants within the controller and slowly varying changes in the amplitude and location are accounted for by adding fictitious noise to the respective constants.

4. The system of claim 2, wherein the amplitude and location of the peak are modeled substantially as constants and rapid changes in the amplitude and location are accounted for by resetting covariances within the Kalman filter associated with the amplitude and location.

5. The system of claim 4, wherein the covariance associated with the location is reset to cover predefined limits based on an expected range of covariance.

6. The system of claim 2, wherein values of the amplitude and location of the peak in the system state equations are each initialized approximately at an upper end of respective predefined ranges.

7. The system of claim 6, wherein the vehicle is an aircraft and the wheel is a wheel of the aircraft running on the runway, and the upper ends for the location and amplitude of the peak are approximately 0.15 and approximately 0.6, respectively.

8. The system of claim 6, wherein the values of the amplitude and location of the peak are initialized whenever the value of at least one parameter defined by state equations used within the controller falls outside a predefined range.

9. The system of claim 1, wherein the controller detects a skid condition based on estimates of velocity of the vehicle and velocity of the wheel provided by the Kalman filter, and as a result of detecting a skid condition causes a reduction in the amount of braking force applied to the wheel.

10. The system of claim 9, wherein the controller is configured to cause a reapplication of braking force to the wheel upon an estimated slip ratio between the wheel and the running surface dropping to approximately 40% the location of the peak.

11. The system of claim 1, wherein the controller causes the braking force applied to the wheel to incrementally increase towards the peak of the mu-slip curve based on an adaptive proportional gain term.

12. The system of claim 11, wherein the adaptive proportional gain term is based on the amplitude and the location of the peak in the mu-slip curve.

13. The system of claim 12, wherein the adaptive proportional gain term is proportional to an estimated average slope of the mu-slip curve.

14. The system of claim 1, wherein the controller computes a slip ratio set point based on the location of the peak of the mu-slip curve and controls the amount of braking force provided to the wheel based on the slip ratio set point.

15. The system of claim 14, wherein in computing the slip ratio set point the controller introduces an excitement signal to a term based on the location of the peak of the mu-slip curve in order to increase the observability of the term by the Kalman filter.

16. The system of claim 15, wherein the excitement signal functions to increase the observability of the amplitude and location of the peak of the mu-slip curve by the Kalman filter.

17. The system of claim 15, wherein the excitement signal is a periodic waveform having an amplitude based on the location of the peak.

18. The system of claim 17, wherein the excitement signal is a sinusoid.

19. The system of claim 1, further comprising a brake actuator and brake assembly operatively coupled to the controller for providing the braking force to the wheel based on a control signal output by the controller, and wherein the controller models the brake actuator to account for a response time of the brake actuator as a nominal value with a fictitious process noise representing changes in the response of the brake actuator due to wear.

20. The system of claim 1, wherein system state equations implemented within the controller define the speed of the wheel, the speed of the vehicle, and the radius of the wheel, and during initialization of the system state equations the speed of the wheel is initialized based on the output of the sensor.

21. The system of claim 20, wherein the speed of the vehicle is initialized by multiplying the initialized speed of the wheel by a predefined nominal value of the radius of the wheel.

22. A brake control system for controlling an amount of braking force applied to a wheel of a vehicle running on a surface, comprising:
  a sensor for measuring a speed of the wheel; and
  a controller, operatively coupled to the sensor, which implements a state estimator to estimate an amplitude and location of a peak in a mu-slip curve representative of a coefficient of friction between the wheel and the surface based on an output of the sensor, and which controls the amount of braking force applied to the wheel based on the amplitude and location of the peak.

23. The system of claim 22, wherein the state estimator comprises a state vector including elements V, ω, $\mu_p$ and $r_p$, where V represents the velocity of the vehicle, ω represents the speed of the wheel, $\mu_p$ represents the peak of the mu-slip curve, and $r_p$ represents the location of the peak of the mu-slip curve.

24. The system of claim 23, wherein the state vector further includes elements P and r, where P represents brake pressure applied to the wheel and r represents the radius of the wheel.

25. The system of claim 22, wherein the mu-slip curve, represented by $\mu$, is generally modeled within the state estimator by the following mathematical function:

$$\mu = (\mu_p 62)(r_{slip}/r_p)/\{(\beta-1)+|r_{slip}/r_p|^\beta\}$$

where $\mu_p$ represents the peak of the mu-slip curve, $r_{slip}$ represents the relative amount of slip between the wheel and the surface, $r_p$ represents the location of the peak of the mu-slip curve, and β is a parameter which controls the steepness of the mu-slip curve.

26. A brake control system for controlling an amount of braking force applied to a wheel of a vehicle running on a surface, comprising:
  a sensor for measuring a speed of the wheel; and
  a controller, operatively coupled to the sensor, for estimating a location of a peak in a mu-slip curve representative of a coefficient of friction between the wheel and the surface based on an output of the sensor, and for controlling the amount of braking force applied to the wheel so as to maintain a slip ratio with respect to the velocity of the wheel compared to a velocity of the vehicle at or near the location of the peak in the mu-slip curve without tending to exceed the location of the peak.

27. The brake control system of claim 26, wherein the controller controls the amount of braking force applied to the wheel based on the following equation for peak applied brake pressure $P_p$:

$$P_p = (\mu_p/k)[W_t r + g\, I(1-r_p)/r]$$

where $\mu_p$ represents the peak of the mu-slip curve, k represents the torque to pressure ratio between a brake and the wheel, $W_t$ represents the weight per wheel, r represents the radius of the wheel, g represents acceleration due to gravity, I represents inertia of the brake and the wheel, and $r_p$ represents the location of the peak of the mu-slip curve.

28. A brake control system for controlling an amount of braking force applied to a wheel of a vehicle running on a surface, comprising:
  a sensor for measuring a speed of the wheel and for providing an output signal indicative of the speed; and
  a controller, operatively coupled to the sensor, which implements a Kalman filter to estimate at least one parameter of a mu-slip curve representative of a coefficient of friction between the wheel and the surface based on the output signal of the sensor, and controls the amount of braking force applied to the wheel based on the estimated parameter;
  wherein the controller is configured to reset a covariance associated with the at least one parameter in the Kalman filter upon detection of a skid condition between the wheel and the surface.

29. The system of claim 28, wherein the at least one parameter comprises an amplitude and location of a peak of the mu-slip curve.

30. A brake control system for controlling an amount of braking force applied to a wheel of a vehicle running on a surface, comprising:
  a sensor for measuring a speed of the wheel and for providing an output signal indicative of the speed; and
  a controller, operatively coupled to the sensor, which implements a Kalman filter to estimate at least one parameter of a mu-slip curve representative of a coefficient of friction between the wheel and the surface based on the output signal of the sensor, and controls the amount of braking force applied to the wheel based on the estimated parameter;
  wherein the controller is configured to employ an adjustable amount of control gain in controlling the amount of braking based on the estimated parameter.

31. The system of claim 30, wherein the adjustable amount of control gain is proportional to a slope of the mu-slip curve as estimated by the Kalman filter.

32. The system of claim 31, wherein the controller provides a higher level of control when the slope of the mu-slip curve is relatively steep as compared to a lower level of control which is provided when the slope of the mu-slip curve is relatively less steep.

33. A brake control system for controlling an amount of braking force applied to a wheel of a vehicle running on a surface, comprising:
  a sensor for measuring a speed of the wheel; and
  a controller, operatively coupled to the sensor, which implements a state estimator to estimate at least one parameter of a mu-slip curve representative of a coefficient of friction between the wheel and the surface based on an output of the sensor, and which controls the amount of braking force applied to the wheel based on the at least one parameter;
  wherein the amount of braking force is determined at least in part by a predefined mathematical function comprising a periodic component for increasing an ability of the state estimator to observe the at least one parameter.

34. The system of claim 33, wherein the function comprises a first term which is proportional to a value of the at least one parameter, and a second term which comprises the periodic component multiplied by the value of the at least one parameter.

35. The system of claim 33, wherein the at least one parameter is a peak of the mu-slip curve.

36. The system of claim 35, wherein the periodic component comprises a sinusoid.

37. A method for controlling an amount of braking force applied to a wheel of a vehicle running on a surface, comprising:
  measuring a speed of the wheel and for providing an output signal indicative of the speed; and
  using Kalman filter techniques to estimate an amplitude and location of a peak in a mu-slip curve representative of a coefficient of friction between the wheel and the surface based on the output signal of the sensor, and controlling the amount of braking force applied to the wheel based on the amplitude and location of the peak.

38. The system of claim 1, wherein a torque to pressure ratio k of a brake applying the braking force to the wheel is modeled by a system state equation implemented within the controller, the torque to pressure ratio k being modeled substantially as a constant and slowly varying changes in k being accounted for by adding fictitious noise to the constant.

39. The system of claim 38, wherein the fictitious noise comprises a component which takes into account a change in brake coefficient of friction due to heating.

40. The system of claim 38, wherein the fictitious noise comprises a component which takes into account a time rate of change of the pressure applied by the brake.

41. The system of claim 23, wherein the state vector further includes torque to pressure ratio k of a brake applying the braking force to the wheel.

42. The system of claim 15, wherein the excitement signal is a periodic waveform having an amplitude preselected to provide a preselected degree of modulation of pressure provided by the brake to apply the braking force.

43. A brake control system for controlling an amount of braking force applied to a wheel of a vehicle running on a surface, comprising:

a sensor for measuring a speed of the wheel; and a controller, operatively coupled to the sensor, which implements a state estimator to estimate at least one parameter of a mu-slip curve representative of a coefficient of friction between the wheel and the surface based on an output of the sensor, and which controls the amount of braking force applied to the wheel based on the at least one parameter;

wherein the state estimator initializes the at least one parameter by setting the at least one parameter to an initial value which is predetermined to be greater than an expected true value of the at least one parameter.

44. The system of claim 43, wherein the state estimator selects a covariance for the at least one parameter which is large enough to encompass a predefined range within which the at least one parameter is expected to exist.

45. The system of claim 44, wherein the at least one parameter is selected from a group consisting of a peak of the mu-slip curve and a location of the peak of the mu-slip curve.

46. A brake control system for controlling an amount of braking force applied to a wheel of a vehicle running on a surface, comprising:

a sensor for measuring a speed of the wheel; and a controller, operatively coupled to the sensor, for estimating a location of a peak in a mu-slip curve representative of a coefficient of friction between the wheel and the surface based on an output of the sensor, and for controlling the amount of braking force applied to the wheel based on an operating point biased towards maintaining a slip ratio with respect to the speed of the wheel compared to a velocity of the vehicle, below the location of the peak in the mu-slip curve.

47. The system of claim 28, wherein the covariance is reset based on a difference between a current estimate of the at least one parameter and a preselected nominal value for the at least one parameter.

48. The system of claim 47, wherein the at least one parameter comprises a plurality of parameters and respective covariances are independently set for each of the plurality of parameters based on a difference between a corresponding current estimate and a corresponding preselected nominal value.

49. A method for controlling rotation of a wheel of a vehicle running on a surface, comprising:

measuring a speed of the wheel with a sensor to provide an output signal indicative of the speed;

applying a state estimator to the output signal of the sensor to estimate an amplitude and location of a peak in a mu-slip curve representative of a coefficient of friction between the wheel and the surface; and controlling the rotation of the wheel relative to the surface based on the amplitude and location of the peak.

50. The method of claim 49, wherein the state estimator comprises a Kalman filter.

51. The method of claim 49, wherein the step of controlling the rotation comprises a step of applying a braking force to the wheel.

52. A method for controlling rotation of a wheel of a vehicle running on a surface, comprising:

measuring a speed of the wheel with a sensor to provide an output signal indicative of the speed;

estimating a location of a peak in a mu-slip curve representative of a coefficient of friction between the wheel and the surface based on the output signal of the sensor, and controlling the rotation of the wheel relative to the surface to maintain a slip ratio with respect to the speed of the wheel compared to a velocity of the vehicle at or near the location of the peak in the mu-slip curve without tending to exceed the location of the peak.

53. A method for controlling rotation of a wheel of a vehicle running on a surface, comprising:

measuring a speed of the wheel with a sensor to provide an output signal indicative of the speed;

estimating a location of a peak in a mu-slip curve representative of a coefficient of friction between the wheel and the surface based on the output signal of the sensor, and controlling the rotation of the wheel relative to the surface based on an operating point biased towards maintaining a slip ratio with respect to the speed of the wheel compared to a velocity of the vehicle, below the location of the peak in the mu-slip curve.

54. The method of claim 53, wherein the step of estimating the location of the peak comprises applying a Kalman filter to the output signal of the sensor.

55. The method of claim 53, wherein the step of controlling the rotation of the wheel comprises the step of applying a braking force to the wheel.

* * * * *